US012288175B2

(12) United States Patent
Miller et al.

(10) Patent No.: US 12,288,175 B2
(45) Date of Patent: *Apr. 29, 2025

(54) AUTOMATED PATH-BASED RECOMMENDATION FOR RISK MITIGATION

(71) Applicant: EQUIFAX INC., Atlanta, GA (US)

(72) Inventors: Stephen Miller, Leeds (GB); Lewis Jordan, Atlanta, GA (US); Matthew Turner, Cumming, GA (US); Mark Day, Leeds (GB); Allan Joshua, Atlanta, GA (US)

(73) Assignee: EQUIFAX INC., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/402,921

(22) Filed: Jan. 3, 2024

(65) Prior Publication Data

US 2024/0185158 A1 Jun. 6, 2024

Related U.S. Application Data

(63) Continuation of application No. 17/753,122, filed as application No. PCT/US2020/046993 on Aug. 19, 2020, now Pat. No. 11,900,294.

(Continued)

(51) Int. Cl.
*G06Q 10/06* (2023.01)
*G06Q 10/0635* (2023.01)
*G06Q 40/03* (2023.01)

(52) U.S. Cl.
CPC ......... *G06Q 10/0635* (2013.01); *G06Q 40/03* (2023.01)

(58) Field of Classification Search
CPC ....................................................... G06Q 10/06
(Continued)

(56) References Cited

U.S. PATENT DOCUMENTS 7,720,750 B2 5/2010 Brody et al.
10,127,596 B1 11/2018 Franke et al.
(Continued)

OTHER PUBLICATIONS

U.S. Appl. No. 17/753,122, Non-Final Office Action, Mailed on May 25, 2023, 15 pages.
(Continued)

*Primary Examiner* — Nga B Nguyen
(74) *Attorney, Agent, or Firm* — Kilpatrick Townsend & Stockton LLP

(57) ABSTRACT

Systems and methods for automated path-based recommendation for risk mitigation are provided. An entity assessment server, responsive to a request for a recommendation for modifying a current risk assessment score of an entity to a target risk assessment score, accesses an input attribute vector for the entity and clusters of entities defined by historical attribute vectors. The entity assessment server assigns the input attribute vector to a particular cluster and determines a requirement on movement from a first point to a second point in a multi-dimensional space based on the statistics computed from the particular cluster. The first point corresponds to the current risk assessment score and the second point corresponds to the target risk assessment score. The entity assessment server computes an attribute-change vector so that a path defined by the attribute-change vector complies with the requirement and generates the recommendation from the attribute-change vector.

20 Claims, 6 Drawing Sheets

Related U.S. Application Data

(60) Provisional application No. 62/890,480, filed on Aug. 22, 2019.

(58) Field of Classification Search
USPC ........................................................ 705/7.28
See application file for complete search history.

(56) References Cited

U.S. PATENT DOCUMENTS

| | | | |
|---|---|---|---|
| 10,681,060 B2 | 6/2020 | Scheidler et al. | |
| 11,354,608 B2 | 6/2022 | Prakash et al. | |
| 11,373,248 B1 | 6/2022 | Criswell et al. | |
| 11,900,294 B2 * | 2/2024 | Miller | G06N 3/045 |
| 2011/0270779 A1 | 11/2011 | Showalter | |
| 2018/0101591 A1 | 4/2018 | Yamashita et al. | |
| 2018/0101907 A1 | 4/2018 | Yamashita et al. | |
| 2019/0325354 A1 | 10/2019 | Rajnayak et al. | |

OTHER PUBLICATIONS

U.S. Appl. No. 17/753,122, Notice of Allowance, Mailed on Oct. 4, 2023, 11 pages.

Dhurandhar et al., "Explanations based on the Missing: Towards Contrastive Explanations with Pertinent Negatives", Advances in Neural Information Processing Systems, Oct. 30, 2018, 22 pages.

International Application No. PCT/US2020/046993, International Preliminary Report on Patentability, Mailed on Mar. 3, 2022, 9 pages.

International Application No. PCT/US2020/046993, International Search Report and Written Opinion, Mailed on Nov. 13, 2020, 12 pages.

Canadian Application No. CA3,151,805 Office Action, Mailed on Dec. 8, 2023, 4 pages.

\* cited by examiner

AUTOMATED PATH-BASED RECOMMENDATION FOR RISK MITIGATION

CROSS-REFERENCE TO RELATED APPLICATIONS

This application is a continuation of U.S. Ser. No. 17/753,122, filed Feb. 18, 2022, entitled "Automated Path-Based Recommendation for Risk Mitigation," which is a U.S. National Stage of International Application No. PCT/US2020/046993, filed Aug. 19, 2020, entitled "Automated Path-Based Recommendation for Risk Mitigation," which claims priority to U.S. Provisional Application No. 62/890,480, entitled "Automated Path-Based Recommendation for Risk Mitigation," filed on Aug. 22, 2019, the contents of which are hereby incorporated by reference in their entireties for all purposes.

TECHNICAL FIELD

The present disclosure relates generally to artificial intelligence. More specifically, but not by way of limitation, this disclosure relates to using machine learning or other modeling algorithms that emulate intelligence to generate recommended courses of actions.

BACKGROUND

Machine-learning and other automated modeling processes can be used to perform one or more functions (e.g., acquiring, processing, analyzing, and understanding various inputs in order to produce an output that includes numerical or symbolic information). For instance, such techniques can involve using computer-implemented models and algorithms (e.g., a convolutional neural network, a support vector machine, etc.) to simulate human decision-making. In one example, a computer system programmed with a machine-learning model can learn from training data and thereby perform a future task that involves circumstances or inputs similar to the training data. Such a computing system can be used, for example, to recognize certain individuals or objects in an image, to simulate or predict future actions by an entity based on a pattern of interactions to a given individual, etc.

SUMMARY

Various embodiments of the present disclosure provide systems and methods for an automated path-based recommendation for risk mitigation. In one example, an entity assessment server receives, from a user device, a request for a recommendation for modifying a current risk assessment score to a target risk assessment score. The risk assessment score is computed from input attribute values of an entity. The entity assessment server accesses (a) an input attribute vector having the input attribute values of the entity and (b) clusters of points in an n-dimensional space. The clusters of points are respectively defined by historical attribute vectors. The entity assessment server further assigns the input attribute vector to a particular cluster based on a similarity measure between the particular cluster and an input point defined by the input attribute vector and computes an attribute-change vector indicating a path. The path is from (a) a first point that is located in an m-dimensional space and that corresponds to the current risk assessment score to (b) a second point in the m-dimensional space and that corresponds to the target risk assessment score. Applying a risk assessment function to a sum of the input attribute vector and the attribute-change vector outputs the target risk assessment score.

Computing the attribute-change vector includes determining, based on statistics computed from the particular cluster to which the input attribute vector is assigned, a requirement on movement from the first point to the second point and selecting the attribute-change vector that complies with the requirement. The entity assessment server further generates, using the computed attribute-change vector, the recommendation for modifying the current risk assessment score to the target risk assessment score, and transmits, to the user device, the recommendation in response to the request for the recommendation.

This summary is not intended to identify key or essential features of the claimed subject matter, nor is it intended to be used in isolation to determine the scope of the claimed subject matter. The subject matter should be understood by reference to appropriate portions of the entire specification, any or all drawings, and each claim.

The foregoing, together with other features and examples, will become more apparent upon referring to the following specification, claims, and accompanying drawings.

BRIEF DESCRIPTION OF THE DRAWINGS

Features, embodiments, and advantages of the present disclosure are better understood when the following Detailed Description is read with reference to the accompanying drawings.

DETAILED DESCRIPTION

Figure 1:
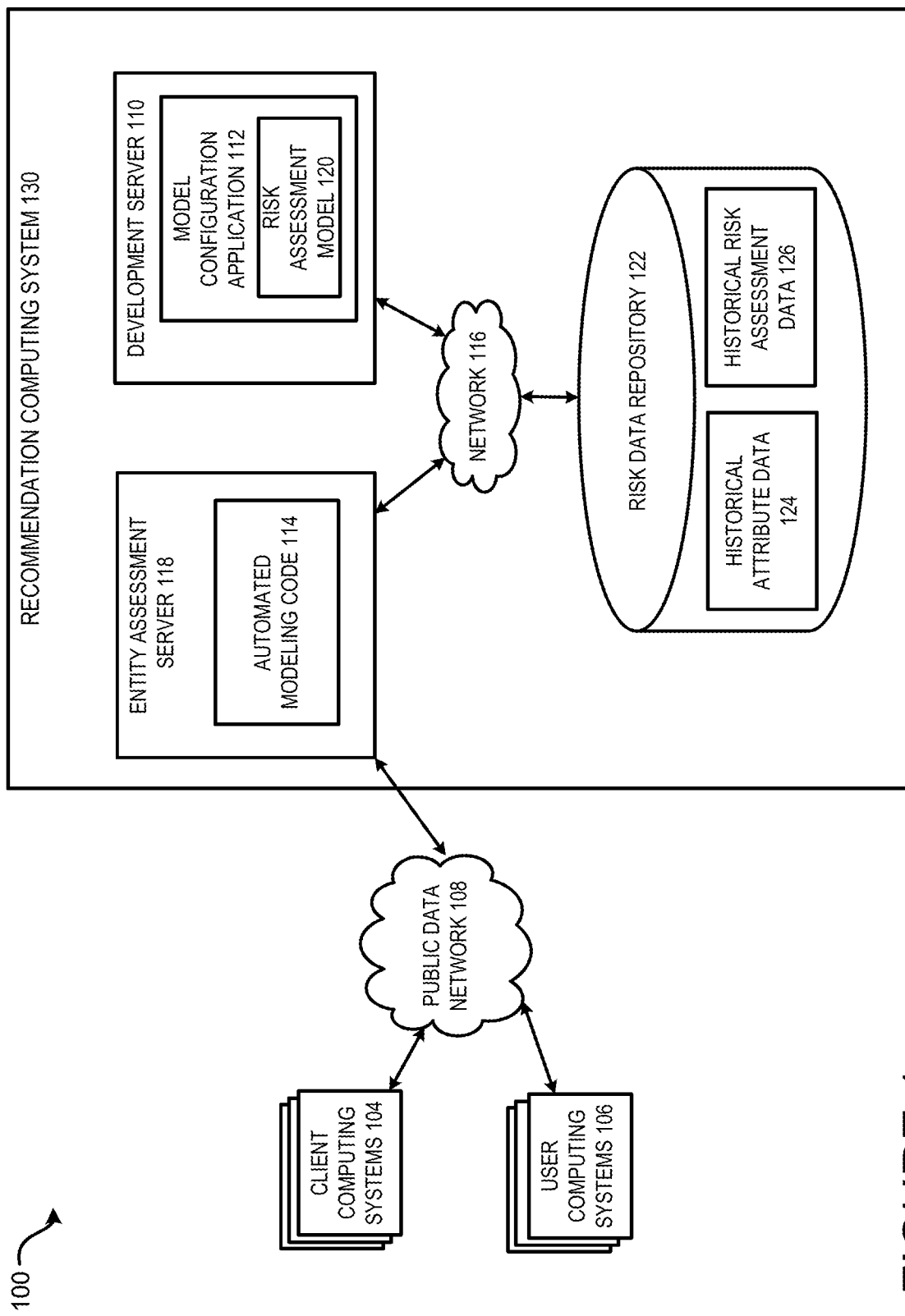
FIG. 1 is a block diagram depicting an example of a computing environment in which path-based recommendation is generated to improve risk assessment scores or other analytical or predictive outputs, according to certain aspects of the present disclosure.

Certain aspects and features of the present disclosure involve providing a path-based recommendation for risk mitigation. In one example, an entity assessment server accesses an input attribute vector for an entity for which the risk assessment is to be improved. Using the values of the input attribute vector, the entity assessment server classifies the entity to a particular cluster of entities and determines requirements on the movement from a current risk assessment score of the entity to a target risk assessment score based on the statistics computed from the particular cluster. The entity assessment server further computes an attribute-change vector complying with the requirements which defines a recommended path from the current risk assessment score to the target risk assessment score. The entity assessment server generates the risk mitigation recommendation according to the attribute-change vector.

For instance, an entity assessment server may receive, from a user device, a request for a recommendation for improving the risk assessment score of an entity. The improvement can include modifying the current risk assessment score, which is computed from input attribute values of the entity, to obtain a target risk assessment score that indicates a lower risk. To generate the recommendation, the entity assessment server accesses an input attribute vector containing the input attribute values for the entity and clusters of entities. The clusters of entities are represented by points in a multi-dimensional space, which can be respectively defined by historical attribute vectors of the entities. The entity assessment server assigns the entity to a particular cluster of entities by assigning the input attribute vector to a particular cluster in the multi-dimensional space. The entity assessment server can calculate the distances between an input point defined by the input attribute vector of the entity and the centroids of the clusters and assign the entity to the particular cluster based on the distances.

Continuing with this example, the entity assessment server can further determine the statistics of the particular cluster, such as the precision matrix for the attribute changes observed for entities in the particular cluster and a mean vector of the attribute changes. Using these statistics, the entity assessment server can formulate and solve an optimization problem in order to achieve the target risk assessment score. For example, the optimization problem can involve finding an attribute-change vector so that the distance of a path from a first point in an m-dimensional space (corresponding to the current risk assessment score) to a second point in the m-dimensional space (corresponding to the target risk assessment score) is minimized. The distance can include, for example, the Mahalanobis distance defined using the statistics of the particular cluster to which the entity is assigned. The determined attribute-change vector indicates the changes that can be made to the input attribute values so that the risk assessment score determined using the sum of the input attribute vector and the attribute-change vector equals the target risk assessment score.

The entity assessment server can further generate a risk-mitigation recommendation according to the attribute-change vector explaining the changes that can be made to the input attributes in order to achieve the target risk assessment score. The entity assessment server may further determine the impact of each attribute in the attribute-change vector on the improvement from the current risk assessment score to the target risk assessment score and include the determined impacts in the recommendation.

In some examples, the time period for which the recommendation is generated can be divided into multiple shorter time periods. The process for determining the attribute-change vector described above can be repeated to determine multiple attribute-change vectors, one for each of these multiple time periods. The collection of the multiple attribute-change vectors forms a path from the current risk assessment score to the target risk assessment score and can be used to generate the risk mitigation recommendation for the entity.

The generated recommendation can be utilized in various applications to improve the operations of the corresponding systems. As an illustrative example, the risk assessment score of an entity generated by a risk assessment model may indicate the likelihood of failure of one or more components in an industrial environment associated with the entity or indicate the risk of granting the entity access to an interactive computing environment. The generated recommendation can serve as instructions to the entity to reduce the likelihood of failure or to increase its chance of being granted access to the interactive computing environment. Furthermore, the recommendation can also be utilized to improve the risk assessment model to prevent malicious entities from achieving the desired target risk score thereby obtaining access to the interactive computing environment. For example, if the recommendation shows that a better assessment risk score can be achieved without substantive changes on the side of the entity (e.g., by merely changing values of less important attributes such as the location of a device used to access the interactive computing environment), the risk assessment model can be revised to assign lower weights to those attributes or remove those attributes from the inputs to the risk assessment model.

As described herein, certain aspects provide improvements to risk assessment models for evaluating risks associated with an entity. Compared with existing risk assessment models which only provide a predicted risk assessment score associated with an entity without providing explanation on how to achieve such a score, the technologies presented herein can automatically generate a recommendation of actions that an entity can take to improve its risk assessment score to a desired value which may help to improve the security or stability of the system associated with the entity. Further, the recommendation can also be utilized to improve the accuracy of the risk assessment model by identifying attributes that should be deemphasized or removed from the risk assessment model inputs. Additional or alternative aspects can implement or apply rules of a particular type that improve existing technological processes involving risk assessment. For instance, to find the optimized path from the current risk assessment score to the target assessment score, a particular set of rules are employed in the modeling process. This particular set of rules allows the target risk assessment score to be achieved, prevents an infeasible solution from being used, or facilitates a shorter path to be identified from the current risk assessment score to the target assessment score. Furthermore, additional rules can be introduced in the model to further increase the efficiency of the algorithm, such as rules for limiting the values of variables within their respective boundaries, rules for enforcing the variables to be of their particular types (e.g., integer values), or rules for enforcing the value changes of the variables (e.g., time-related variables automatically increase their values with time). These particular rules enable the algorithm to be performed efficiently, i.e. the process can be completed faster and requiring fewer computational resources without searching in the nonfeasible solution space, and effectively, i.e. the solution found using the algorithm is optimized or nearly optimized.

These illustrative examples are given to introduce the reader to the general subject matter discussed here and are not intended to limit the scope of the disclosed concepts. The following sections describe various additional features and examples with reference to the drawings in which like numerals indicate like elements, and directional descriptions are used to describe the illustrative examples but, like the illustrative examples, should not be used to limit the present disclosure.

Operating Environment Example

Referring now to the drawings, FIG. 1 is a block diagram depicting an example of an operating environment 100 in which a recommendation computing system 130 generates recommendations for improving risk assessment scores or other analytical or predictive outputs. FIG. 1 depicts examples of hardware components of a recommendation computing system 130, according to some aspects. The recommendation computing system 130 is a specialized computing system that may be used for processing large amounts of data using a large number of computer processing cycles. The recommendation computing system 130 can include a development server 110 for building, training, or otherwise modifying a risk assessment model 120. The recommendation computing system 130 can further include an entity assessment server 118, which can execute automated modeling code 114 that utilizes a trained risk assessment model 120 and attribute data from a risk data repository 122 to generate one or more recommendations with respect to one or more entities.

The development server 110 can include one or more processing devices that execute program code, such as a model configuration application 112. The program code is stored on a non-transitory computer-readable medium. The model configuration application 112 can execute one or more processes to train and optimize a risk assessment model 120 (e.g., a neural network, a decision tree, etc.) for generating analytical or predictive outputs (e.g., risk assessment scores) based on one or more input variables, such as attributes that describe an entity.

In some embodiments, the model configuration application 112 can build and train a risk assessment model 120 utilizing historical attribute data 124 and historical risk assessment data 126. The historical attribute data 124 can include, for example, historical attribute vectors. An attribute vector can be a vector having, as its elements, values of different attributes that describe (or are otherwise associated with) an entity, such as an individual, an organization, a device, a system or a component. A historical attribute vector can be an attribute vector with historical attribute data that is gathered from interactions with one or more client computing systems 104, one or more user computing systems 106, or both. The historical risk assessment data 126 can include, for example, data identifying a certain outcome associated with the historical attribute data 124, data identifying a risk assessment associated with the historical attribute data 124, etc. As an illustrative example, risk assessment data can identify certain outcomes, such as a default on a loan, and an attribute vector can include values for attributes associated with the outcomes, such as a number of credit lines held by an entity prior to or during the default, a percentage of credit utilization by the entity prior to or during the default, etc. Historical attribute data 124 and associated risk assessment data 126 can be used by the model configuration application 112 to build, train, or otherwise modify a risk assessment model 120. The historical attribute data 124 can be stored in one or more network-attached storage units on which various repositories, databases, or other structures are stored. Examples of these data structures are the risk data repository 122.

Network-attached storage units may store a variety of different types of data organized in a variety of different ways and from a variety of different sources. For example, the network-attached storage unit may include storage other than primary storage located within the development server 110 that is directly accessible by processors located therein. In some aspects, the network-attached storage unit may include secondary, tertiary, or auxiliary storage, such as large hard drives, servers, virtual memory, among other types. Storage devices may include portable or non-portable storage devices, optical storage devices, and various other mediums capable of storing and containing data. A machine-readable storage medium or computer-readable storage medium may include a non-transitory medium in which data can be stored and that does not include carrier waves or transitory electronic signals. Examples of a non-transitory medium may include, for example, a magnetic disk or tape, optical storage media such as a compact disk or digital versatile disk, flash memory, memory or memory devices.

The entity assessment server 118 can include one or more processing devices that execute program code, such as automated modeling code 114. The program code is stored on a non-transitory computer-readable medium. The automated modeling code 114 can execute one or more processes to utilize the risk assessment model 120 trained by the model configuration application 112 to generate, based on input attribute data, an analytical or predictive output, such as a risk assessment score or a recommendation with respect to the risk assessment score (e.g., a recommended set of actions for improving the risk assessment score). In some aspects, the risk assessment model 120 can also be utilized to generate explanation codes for predictor variables (i.e., input attributes) used to compute the risk assessment score or recommendation. An explanation code indicates an effect or an amount of impact that a given predictor variable has on the analytical or predictive output generated by executed the automated modeling code 114.

In some aspects, the output of the trained risk assessment model 120 can be utilized to modify a data structure in the memory or a data storage device. For example, the predicted risk indicator and/or the explanation codes can be utilized to reorganize, flag, or otherwise change the attribute data involved in the prediction by the risk assessment model 120. For instance, attribute data stored in the risk data repository 122 can be attached with flags indicating their respective amount of impact on the risk indicator. Different flags can be utilized for different attribute data to indicate different levels of impacts. Additionally, or alternatively, the locations of the attribute data in the storage, such as the risk data repository 122, can be changed so that the attribute data are ordered, ascendingly or descendingly, according to their respective amounts of impact on the risk indicator.

By modifying the attribute data in this way, a more coherent data structure can be established which enables the data to be searched more easily. In addition, further analysis of the risk assessment model 120 and the outputs of the risk assessment model 120 can be performed more efficiently. For instance, attribute data having the most impact on the risk indicator can be retrieved and identified more quickly based on the flags and/or their locations in the risk data repository 122. Further, updating the risk assessment model 120, such as by re-training the risk assessment model 120 based on new values of attribute data stored in the risk data repository 122, can be performed more efficiently especially when computing resources are limited. For example, updating or retraining the risk assessment model 120 can be performed by incorporating new values of the attribute data having the most impact on the output risk indicator based on the attached flags without utilizing new values of all the attribute data.

Furthermore, the recommendation computing system 130 can communicate with various other computing systems, such as client computing systems 104. For example, client computing systems 104 may send risk assessment queries, recommendation requests, or both to the entity assessment server 118 for risk assessment, or may send signals to the entity assessment server 118 that control or otherwise influence different aspects of the recommendation computing system 130. The client computing systems 104 may also interact with user computing systems 106 via one or more public data networks 108 to facilitate electronic transactions between users of the user computing systems 106 and interactive computing environments provided by the client computing systems 104.

Each client computing system 104 may include one or more third-party devices, such as individual servers or groups of servers operating in a distributed manner. A client computing system 104 can include any computing device or group of computing devices operated by a seller, lender, or other providers of products or services. The client computing system 104 can include one or more server devices. The one or more server devices can include or can otherwise access one or more non-transitory computer-readable media. The client computing system 104 can also execute instructions that provide an interactive computing environment accessible to user computing systems 106. Examples of the interactive computing environment include a mobile application specific to a particular client computing system 104, a web-based application accessible via a mobile device, etc. The executable instructions are stored in one or more non-transitory computer-readable media.

The client computing system 104 can further include one or more processing devices that are capable of providing the interactive computing environment to perform operations described herein. The interactive computing environment can include executable instructions stored in one or more non-transitory computer-readable media. The instructions providing the interactive computing environment can configure one or more processing devices to perform operations described herein. In some aspects, the executable instructions for the interactive computing environment can include instructions that provide one or more graphical interfaces. The graphical interfaces are used by a user computing system 106 to access various functions of the interactive computing environment. For instance, the interactive computing environment may transmit data to and receive data from a user computing system 106 to shift between different states of the interactive computing environment, where the different states allow one or more electronics transactions between the user computing system 106 and the client computing system 104 to be performed.

A user computing system 106 can include any computing device or other communication device operated by a user, such as a consumer or a customer. The user computing system 106 can include one or more computing devices, such as laptops, smartphones, and other personal computing devices. A user computing system 106 can include executable instructions stored in one or more non-transitory computer-readable media. The user computing system 106 can also include one or more processing devices that are capable of executing program code to perform operations described herein. In various examples, the user computing system 106 can allow a user to access certain online services from a client computing system 104, to engage in mobile commerce with a client computing system 104, to obtain controlled access to electronic content hosted by the client computing system 104, etc.

For instance, the user can use the user computing system 106 to engage in an electronic transaction with a client computing system 104 via an interactive computing environment. An electronic transaction between the user computing system 106 and the client computing system 104 can include, for example, the user computing system 106 being used to request online storage resources managed by the client computing system 104, acquire cloud computing resources (e.g., virtual machine instances), and so on. An electronic transaction between the user computing system 106 and the client computing system 104 can also include, for example, query a set of sensitive or other controlled data, access online financial services provided via the interactive computing environment, submit an online credit card application or other digital application to the client computing system 104 via the interactive computing environment, operating an electronic tool within an interactive computing environment hosted by the client computing system (e.g., a content-modification feature, an application-processing feature, etc.).

In some aspects, an interactive computing environment implemented through a client computing system 104 can be used to provide access to various online functions. As a simplified example, a website or other interactive computing environment provided by an online resource provider can include electronic functions for requesting computing resources, online storage resources, network resources, database resources, or other types of resources. In another example, a website or other interactive computing environment provided by a financial institution can include electronic functions for obtaining one or more financial services, such as loan application and management tools, credit card application and transaction management workflows, electronic fund transfers, etc. A user computing system 106 can be used to request access to the interactive computing environment provided by the client computing system 104, which can selectively grant or deny access to various electronic functions. Based on the request, the client computing system 104 can collect data associated with the user and communicate with the entity assessment server 118 for risk assessment. Based on the risk indicator predicted by the entity assessment server 118, the client computing system 104 can determine whether to grant the access request of the user computing system 106 to certain features of the interactive computing environment.

In a simplified example, the recommendation computing system 130 can configure a neural network to be used for accurately determining risk indicators (e.g., credit scores) using entity attributes, determining adverse action codes or other explanation codes for the entity attributes, computing recommendations for modifying the risk indicators, or some combination thereof. An entity attribute can be any variable predictive of risk that is associated with an entity. Any suitable entity attribute that is authorized for use by an appropriate legal or regulatory framework may be used.

Examples of predictor variables used for predicting the risk associated with an entity accessing online resources include, but are not limited to, variables indicating the demographic characteristics of the entity (e.g., name of the entity, the network or physical address of the company, the identification of the company, the revenue of the company), variables indicative of prior actions or transactions involving the entity (e.g., past requests of online resources submitted by the entity, the amount of online resource currently held by the entity, and so on.), variables indicative of one or more behavioral traits of an entity (e.g., the timeliness of the entity releasing the online resources), etc. Similarly, examples of predictor variables used for predicting the risk associated with an entity accessing services provided by a financial institute include, but are not limited to, indicative of one or more demographic characteristics of an entity (e.g., age, gender, income, etc.), variables indicative of prior actions or transactions involving the entity (e.g., information that can be obtained from credit files or records, financial records, consumer records, or other data about the activities or characteristics of the entity), variables indicative of one or more behavioral traits of an entity, etc.

The predicted risk indicator can be utilized by the service provider to determine the risk associated with the entity accessing a service provided by the service provider, thereby granting or denying access by the entity to an interactive computing environment implementing the service. For example, if the service provider determines that the predicted risk indicator is lower than a threshold risk indicator value, then the client computing system 104 associated with the service provider can generate or otherwise provide access permission to the user computing system 106 that requested the access. The access permission can include, for example, cryptographic keys used to generate valid access credentials or decryption keys used to decrypt access credentials. The client computing system 104 associated with the service provider can also allocate resources to the user and provide a dedicated web address for the allocated resources to the user computing system 106, for example, by adding it in the access permission. With the obtained access credentials and/or the dedicated web address, the user computing system 106 can establish a secure network connection to the computing environment hosted by the client computing system 104 and access the resources via invoking API calls, web service calls, HTTP requests, or other proper mechanisms.

Each communication within the operating environment 100 may occur over one or more data networks, such as a public data network 108, a network 116 such as a private data network, or some combination thereof. A data network may include one or more of a variety of different types of networks, including a wireless network, a wired network, or a combination of a wired and wireless network. Examples of suitable networks include the Internet, a personal area network, a local area network ("LAN"), a wide area network ("WAN"), or a wireless local area network ("WLAN"). A wireless network may include a wireless interface or a combination of wireless interfaces. A wired network may include a wired interface. The wired or wireless networks may be implemented using routers, access points, bridges, gateways, or the like, to connect devices in the data network.

The numbers of devices depicted in FIG. 1 are provided for illustrative purposes. Different numbers of devices may be used. For example, while certain devices or systems are shown as single devices in FIG. 1, multiple devices may instead be used to implement these devices or systems. Similarly, devices or systems that are shown as separate, such as the development server 110 and the entity assessment server 118, may be instead implemented in a signal device or system.

Examples of Operations Involving
Recommendations Based on Optimal Path Planning

FIGS. 2-5 depicts various operations involved that involve generating recommendations based on optimal path planning. For illustrative purposes, FIGS. 2-5 describe these operations with respect to examples such as credit scores and associated attributes. But, in various aspects, the operations described herein can be used to generate recommendations for modifying the actions of other entities. As one example, the recommendation computing system 130 can generate recommendations for reducing the likelihood of failure of one or more components in an industrial environment, where an entity can be a machine or set of machines and entity attributes can include maintenance of the machine, frequency of use, etc. As another example, the recommendation computing system 130 can generate recommendations for reducing the likelihood of failure of a breach or intrusion into a secure computing environment, where an entity can be the computing environment and entity attributes can include various factors indicative of the security of the computing environment.

In an illustrative example involving credit scoring, the recommendation computing system 130 can be used to generate recommendations with respect to credit risk scores. A credit risk score can be an indicator of financial health. Even though there are many different credit risk scores for different applications, they are each a measure of risk on a financial product and a proxy indication of financial health. Therefore, it can be useful and beneficial to consumers to learn more about the profiles of consumers that are assessed as a safe and sound financial risk. In addition, providing recommendations for a personalized path to a consumer to reach a certain risk level profile adds transparency and understanding to credit risk models.

For instance, a consumer may wish to reach a given credit score threshold. This threshold may be an approval threshold, a threshold that qualifies for a better pricing offer, or some other minimum credit risk score required for the consumer to complete a certain type of transaction. In the US, the regulation requires that the "key factors" that impact a credit score must be returned with the credit score. These factors are the items on the credit report that have the largest negative impact on the score. In many instances, these key factors are not immediately actionable to the consumer. However, the recommendation computing system 100 can compute a recommendation that describes or otherwise indicates a set of one or more actions to be taken by a consumer or other entity to reach the credit score threshold. This set of one or more actions can be considered a "path" to reach a user-specified credit risk score (or other risk assessment score).

The path can achieve a desired purpose if the set of one or more actions associated with the path is actionable and feasible. Operations described herein can be used to define a space of feasible actions for a given entity, which can reduce or avoid disadvantages associated with trial-and-error risk-assessment simulators or generic advice based on an analysis of a profile of entity attributes. These operations can include defining optimal paths for improvement using complex scoring surfaces, especially those generated by machine-learning algorithms capturing non-linearities and interactions. In some aspects, these operations can be used to identify risk-mitigation measures, such as actions that should be avoided in order to prevent an undesirable increase in risk (e.g., actions a consumer should not take because the actions would negatively impact their financial health).

Figure 2:
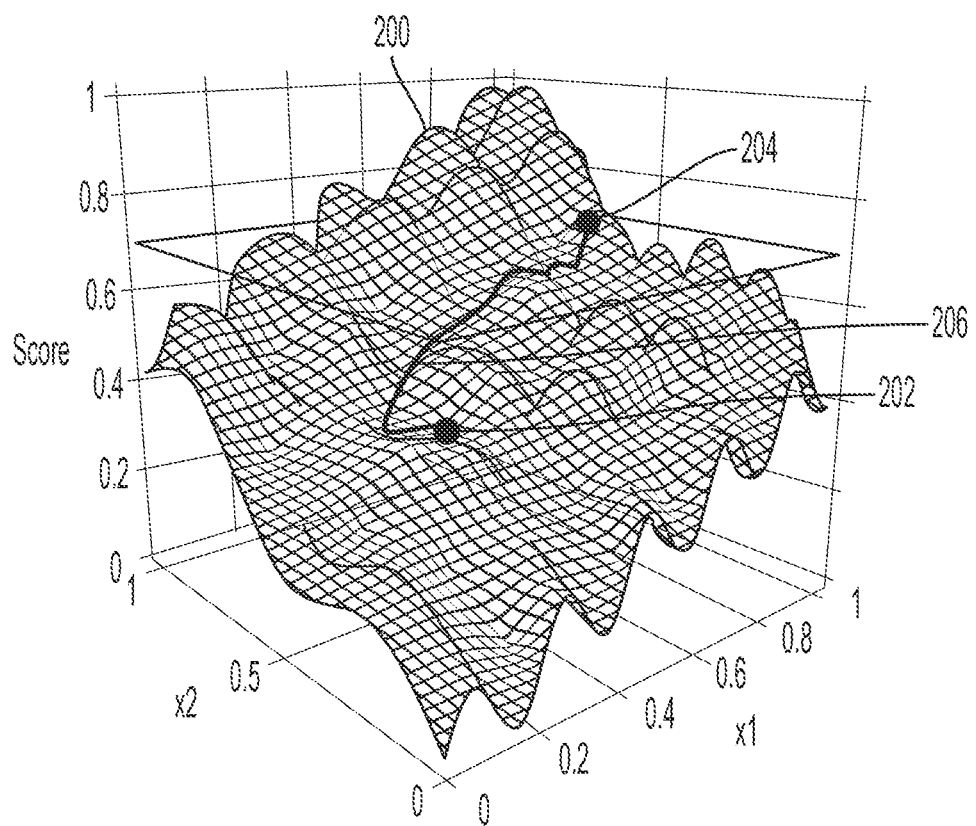
FIG. 2 is a diagram depicting an example of a scoring surface and a path on the scoring surface for achieving a target risk assessment score determined according to certain aspects of the present disclosure.

In some examples, the entity attributes at time t are represented as an n-dimensional vector $\vec{X}^t = [x_1^t, x_2^t, \ldots x_n^t] \in \mathbb{R}^n$, where $x_i^t$ is the value of the i-th entity attribute at time t and n is the total number of entity attributes. As discussed above, the credit score of an entity depends on the entity attributes $\vec{X}^t$. Denote the credit score of an entity at time t as $C_t$ and the relationship between the credit score of an entity and the entity's attributes as $C_t=f(\vec{X}^t)$. Depending on how the credit score is obtained based on the entity's attributes, $f(\cdot)$ can be a function that maps $\vec{X}^t$ to $C_t$ or a machine learning model that predicts $C_t$ based on $\vec{X}^t$. FIG. 2 illustrates an example of a scoring surface 200 generated according to $C=f(x_1, x_2)$. It can be seen from this example that different values of entity attributes $x_1$ and $x_2$ can lead to different credit scores. As such, an entity can take actions to change the value of its entity attributes to increase the credit score.

FIG. 2 depicts a simplified example in which a relationship between attribute data and a risk assessment score is modeled in a multi-dimensional space. In this example, risk assessment scores include a current score 202 and a target score 204 that are associated with an entity. There are multiple ways for the entity to achieve the target score 204 from the current score 202. The solid black line illustrated in FIG. 2 shows a scoring path 206 along which an entity can improve its credit score from the current score to the target score. To follow the scoring path, the entity can take actions to change the entity attributes as indicated in the scoring path. For example, the scoring path 206 shows that to increase the score from the current score of 0.4 to the target score 0.76, the attribute $x_1$ should be increased from 0.3 to 0.9 and the attribute $x_2$ should be increased from 0.5 to 0.7. If entity attribute $x_1$ represents the number of on-time payments of credit cards and $x_2$ represents the number of on-time payments of a home loan, the entity can proactively take actions to increase the on-time payments of the credit cards and loan to reach the target score.

In some examples, the recommendation computing system 130 is configured to determine the shortest feasible scoring path from the current score to the target score. A scoring path is feasible if feasibility constraints are satisfied. One example of the feasibility constraints is that every point on the scoring path falls near the manifold of the development data $\vec{X}$. Other examples of feasibility constraints include constraints such as auto-incremented constraints on entity attributes that automatically increase with time, such as the age of a bank account, the age of a loan, etc. Further examples of feasibility constraints include the time constraints imposed on the change of the entity attributes. For example, a consumer that just filed bankruptcy has a positive indicator in his bankruptcy entity attribute and it will take years to change the indicator from positive to negative. As such, a scoring path involving removing the positive indicator in the bankruptcy entity attribute within one month is an infeasible path. A scoring path that is not feasible does not provide actionable suggestions for the entity to improve its credit score.

To a certain degree, the length of the scoring path reflects the time that an entity needs to increase its credit score. A longer scoring path indicates larger changes to the values of the entity attributes and thus might need a longer time for the entity to follow. As such, to facilitate an entity to increase his credit score as fast as possible, the recommendation computing system 130 determines the shortest feasible scoring path. Due to reasons such as the feasibility constraints discussed above, in some examples, the length of the scoring path is measured using the Mahalanobis distance T. In these examples, the Mahalanobis distance or the length of a straight line scoring path is defined as:

$$T(\vec{\delta}) = \sqrt{(\vec{\delta}-\vec{\mu})^T P(\vec{\delta}-\vec{\mu})}, \qquad (1)$$

where $\vec{\delta}$ is a vector representing the changes of the entity attributes in order to change the current score to the target score, i.e. $\vec{\delta}=\vec{X}^2-\vec{X}^1$. $\vec{X}^1$ is the entity attribute vector corresponding to the current credit score and $\vec{X}^2$ is the entity attribute vector corresponding to the target credit score. $\vec{\delta}$ corresponds to the actions that the entity can take to achieve the score increase. $\vec{\mu}$ and P are the mean and the precision matrix of the distribution where $\vec{\delta}$ is drawn, respectively. The precision matrix P is the inverse of the covariance matrix $\Sigma$ of the distribution of $\vec{\delta}$. The Mahalanobis distance used directly in this way provides the length of a straight line path or a small step. In some examples, the path may be curved. To calculate the total length of a curved path, the Mahalanobis distance can be used as a Riemannian metric.

Accordingly, the problem of determining the actions that an entity can take to increase its current credit score to the target score becomes an optimization problem of finding a $\vec{\delta}$ that leads to the shortest feasible scoring path subject to a constraint of $f(\vec{X}^2)-f(\vec{X}^1) \stackrel{def}{=} f(\vec{X}^1+\vec{\delta})-f(\vec{X}^1)=\Delta C$ and other constraints such as other feasibility constraints. $\Delta C$ is the desired credit score increase. This optimization problem can be mathematically formulated as:

$$\min: T^2 \stackrel{def}{=} (\vec{\delta}-\vec{\mu})^T P(\vec{\delta}-\vec{\mu}) \qquad (2)$$

$$\text{subject to: } f(\vec{X}^2)-f(\vec{X}^1) \stackrel{def}{=} f(\vec{X}^1+\vec{\delta})-f(\vec{X}^1)=\Delta C. \qquad (3)$$

In other scenarios, instead of specifying a target credit score, an entity might want to maximize the increase of his credit score within a given time period. As discussed above, the length of the scoring path is related to the time period. As such, the given time period can be formulated as a constraint on the length of the scoring path. The optimization problem under this scenario becomes maximizing the score increase under a constraint on the length of the scoring path and other feasibility constraints. This optimization problem can be mathematically formulated as:

$$\max: f(\vec{X}^2)-f(\vec{X}^1) \stackrel{def}{=} f(\vec{X}^1+\vec{\delta})-f(\vec{X}^1) \qquad (4)$$

$$\text{subject to: } T^2 \stackrel{def}{=} (\vec{\delta}-\vec{\mu})^T P(\vec{\delta}-\vec{\mu}) \le b, \qquad (5)$$

where b is the upper bound of the scoring path length determined based on the specified time period.

The optimization problems formulated above can be further modified to add additional constraints such as the feasibility constraints, constraints enforcing integer values for integer-valued attributes, and so on. These optimization problems can be solved using any existing optimization algorithms depending on the form of the functions involved in the problem and the value of the entity attributes. For example, linear programming can be utilized to solve the problem if $f(\cdot)$ is a linear function. Non-linear programming can be employed if $f(\cdot)$ is a non-linear function. Mixed-integer programming may be used if $\vec{\delta}$ includes both integer and non-integer values. Examples of methods for solving the above optimization problem are provided later in this present disclosure. In some aspects, the operations described above with respect to Equations (1)-(5) can be used to implement steps for optimizing an objective function having a term for the attribute-change vector.

Figure 3:
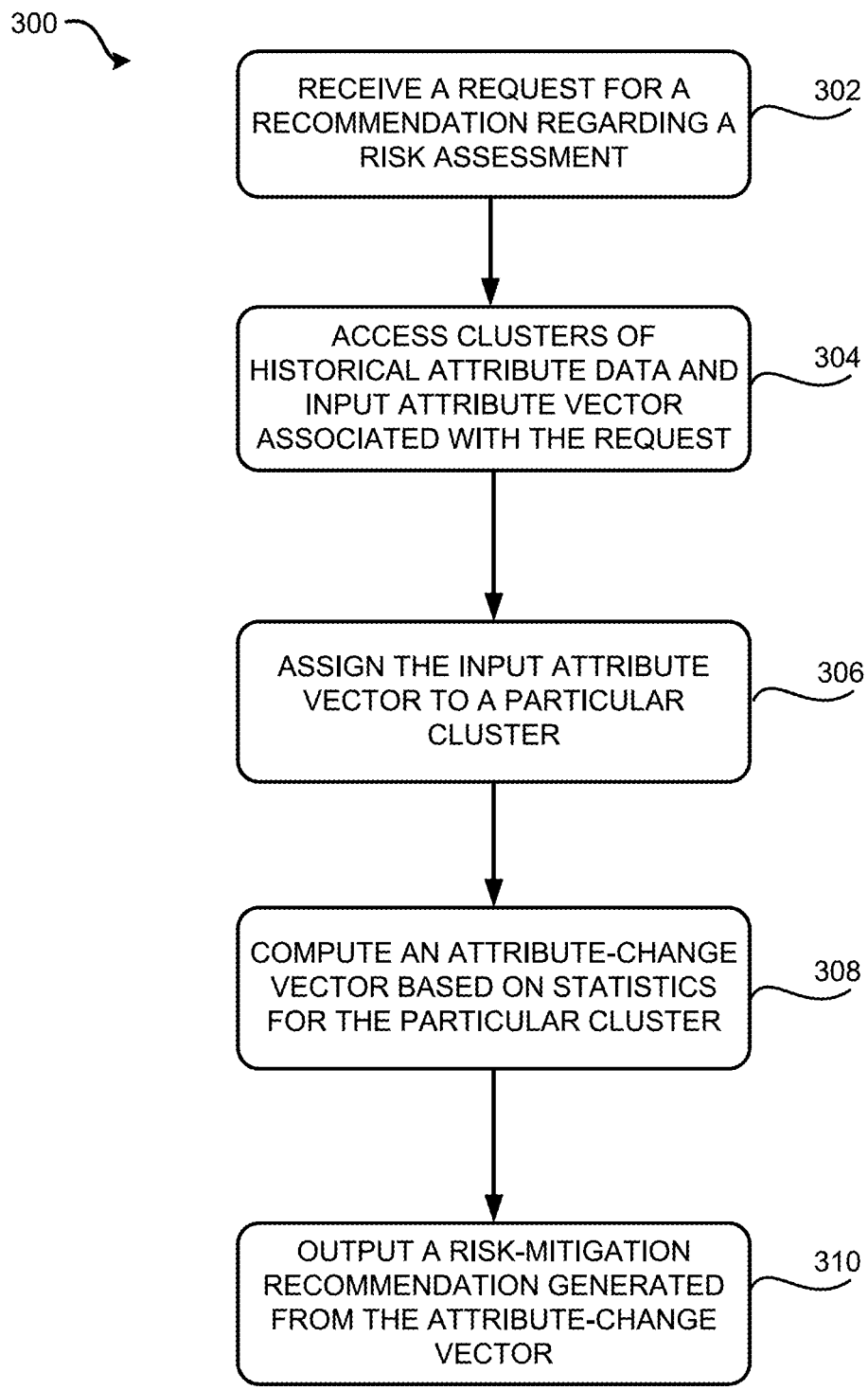
FIG. 3 is a flow chart depicting an example of a process for performing a path-based recommendation for risk mitigation according to certain aspects of the present disclosure.

FIG. 3 is a flow chart depicting an example of a process 300 for performing a path-based recommendation for risk mitigation. For illustrative purposes, the process 300 is described with reference to implementations described with respect to various examples depicted in FIG. 1. Other implementations, however, are possible. The operations in FIG. 3 are implemented in program code that is executed by one or more computing devices, such as the automated modeling code 114 that is executed by an entity assessment server 118. In some aspects of the present disclosure, one or more operations shown in FIG. 3 may be omitted or performed in a different order. Similarly, additional operations not shown in FIG. 3 may be performed.

At block 302, the process 300 involves receiving a request for a recommendation regarding a risk assessment. The entity assessment server 118 can execute the automated modeling code 114 and thereby perform one or more operations that implement block 302. For example, the entity assessment server 118 can establish or join a communication session with a remote computing device, such as a client computing system 104 or a user computing system 106. The entity assessment server 118 can receive a request for a recommendation regarding a risk assessment. In some aspects, the request includes data that identifies or can be used to identify a particular entity. Examples of this data include the name of an entity, an identifier of a record in which data about the entity is stored, etc. The request can indicate different types of recommendations. In various examples, the request can indicate that a recommendation for increasing a risk assessment score (e.g., a credit score indicating financial health) is desired, that a recommendation for decreasing a risk assessment score (e.g., a likelihood of a machine failure, a default, a breach, etc.) is desired, that a recommendation for avoiding a change in a risk assessment score (e.g., actions to avoid in order to maintain a current health or system performance) is desired, etc.

At block 304, the process 300 involves accessing clusters of historical attribute data and an input attribute vector associated with the request. The entity assessment server 118 can execute the automated modeling code 114 and thereby perform one or more operations that implement block 304.

The entity assessment server 118 can access the clusters of historical attribute data from the risk data repository 122, or can retrieve the historical attribute data from the risk data repository 122 and organize the retrieved historical attribute into the clusters. For example, n-dimensional attribute vectors can be used to organize attribute data for a particular entity identified from the request as well as historical attribute data used to generate the recommendation. Any given attribute vector defines a point in an n-dimensional space. For instance, an attribute vector with values for 100 different attributes can be modeled as a particular point in a 100-dimension space, where the coordinates of the point are the values of the attribute vector's elements.

Historical attribute data can be clustered in such an n-dimensional space. For instance, a set of the historical attribute data 124 could include attribute values for various entities that have been collected over time. These attribute values can be organized into historical attribute vectors. The historical attribute vectors define points in the n-dimensional space. The entity assessment server 118 or another computing device of the recommendation computing system 130 can apply a clustering analysis to these points, and can thereby generate clusters of the points. In this manner, different subsets of historical attribute vectors are clustered together. Examples of this cluster analysis are described herein with respect to FIGS. 4 and 5.

The entity assessment server 118 can access an input attribute vector from any suitable source. An input attribute vector can include a vector $\vec{X}^i$ for the entity i. The input attribute vector includes the input attribute values for the entity. In some aspects, the input attribute values can be included in the request received at block 302. In additional or alternative aspects, the entity assessment server 118 can identify the entity from the request and can use the identity of the entity to retrieve the entity's input attribute values from the risk data repository 122.

At block 306, the process 300 involves assigning the input attribute vector to a particular cluster. The entity assessment server 118 can execute the automated modeling code 114 and thereby perform one or more operations that implement block 306. For example, the entity assessment server 118 can compute, for each of the clusters, the distance between a centroid of the cluster and an input point in the n-dimensional space, where the input point is defined by the input attribute vector. In this example, the entity assessment server 118 can determine which of these computed distances is the shortest distance, and can assign the input attribute vector to the cluster having a centroid that is the shortest distance from the input point.

At block 308, the process 300 involves computing an attribute-change vector $\vec{\delta}$ based on statistics for the particular cluster. The entity assessment server 118 can execute the automated modeling code 114 and thereby perform one or more operations that implement block 308.

For example, the attribute-change vector can indicate a path from a first point, which is in an m-dimensional space and corresponds to a current risk assessment score, to a second point, which is in the m-dimensional space and corresponds to a target risk assessment score. In this example, m could be greater than or equal to n. As one example, an n-dimensional attribute vector could include an element for a risk assessment score such that the n attributes and the risk assessment score collectively define a space with a dimension of n+1.

The entity assessment server 118 can determine, based on statistics computed from the particular cluster to which the input attribute vector is assigned, a constraint on movement from the first point to the second point within the m-dimensional space. The entity assessment server 118 can select the attribute-change vector based on a path that is defined by (or otherwise indicated by) the attribute-change vector complying with at least this constraint. (Examples of computing an attribute-change vector based on statistics for a particular cluster are described herein with respect to FIGS. 4 and 5.) For instance, a risk assessment function f could define an (m−1)-dimensional surface within the m-dimensional space. A given path can comply with the constraint if the path is the shortest path along the (m−1)-dimensional surface between the first point and the second point.

In additional or alternative aspects, the entity assessment server 118 can compute an attribute-change vector that defines (or otherwise indicates) a path that complies with one or more additional constraints. One example of these additional constraints is an integer constraint requiring an element of the attribute-change vector to have an integer value. Another example of these additional constraints is an auto-increment constraint requiring an element of the attribute-change vector to increase over a time period. In this example, the time period can be defined by a first time value associated with the first point in the m-dimensional space and a second time value associated with the second point in the m-dimensional space. Another example of these additional constraints is a time constraint preventing an element of the attribute-change vector from changing over the time period. In this example, the time period can be defined by a first time value associated with the first point in the m-dimensional space and a second time value associated with the second point in the m -dimensional space. Another example of these additional constraints is applied to the sum of the input attribute vector and the attribute-change vector. At block 308, an attribute-change vector can be computed subject to one or more of these constraints.

At block 310, the process 300 involves outputting a risk-mitigation recommendation that is generated from the attribute-change vector. The entity assessment server 118 can execute the automated modeling code 114 and thereby perform one or more operations that implement block 310. Outputting the risk-mitigation recommendation can include, for example, storing the risk-mitigation recommendation in a non-transitory computer-readable medium accessible by a computing device from which the request was received at block 302, transmitting the risk-mitigation recommendation to the computing device from which the request via one or more data networks, or some combination thereof.

The entity assessment server 118 can generate the risk-mitigation recommendation in any suitable manner. In some aspects, the entity assessment server 118 can generate the risk-mitigation recommendation by outputting a report listing at least some of the attributes represented by the attribute-change vector and the corresponding changes in attribute values identified in the attribute-change vector. As a simplified example, if the attribute-change vector includes elements $x_1$ and $x_2$ respectively representing a percentage of credit utilization and a number of credit lines, the risk-mitigation recommendation could state "desirable change in credit utilization" along with the value of $x_1$ and state "desirable change in the number of credit lines" along with the value of $x_2$. In addition, the entity assessment server 118 can further determine the impact of each attribute in the attribute-change vector on modifying the current risk assessment score to the target risk assessment score. The entity assessment server 118 can further include the determined impacts in the recommendation. Additional details on determining the impact of each attribute in the attribute-change vector on the risk assessment score change are described below with respect to FIG. 5.

In additional or alternative aspects, the entity assessment server 118 can generate the risk-mitigation recommendation using explanation codes generated using the risk assessment model 120. For instance, the risk assessment model 120 could use a set of input attributes to compute a risk assessment score, and could identify (using the explanation codes) a smaller subset of these input attributes having the largest impact on the computation of the risk assessment score. To generate the risk-mitigation recommendation, the entity assessment server 118 can access these explanation codes and identify this smaller subset of the input attributes. The entity assessment server 118 can output, as the risk-mitigation recommendation, a report listing only the attributes in this smaller subset and the corresponding changes in attribute values identified in the attribute-change vector.

In additional or alternative aspects, the entity assessment server 118 can generate the risk-mitigation recommendation by applying one or more recommendation algorithms to the attribute-change vector. For instance, an automated recommendation algorithm (e.g., a neural network, a decision tree, etc.) may be configured to identify one or more specific actions required to obtain a change in an attribute value that is included in the attribute-change vector. The entity assessment server 118 can execute this automated recommendation algorithm using, as input data, one or more changes in attribute values from the attribute-change vector. The automated recommendation algorithm can output the set of specific actions. The entity assessment server 118 can include, in the risk-mitigation recommendation, the set of specific actions instead of (or in addition to) various attributes and values from the attribute-change vector.

Figure 4:
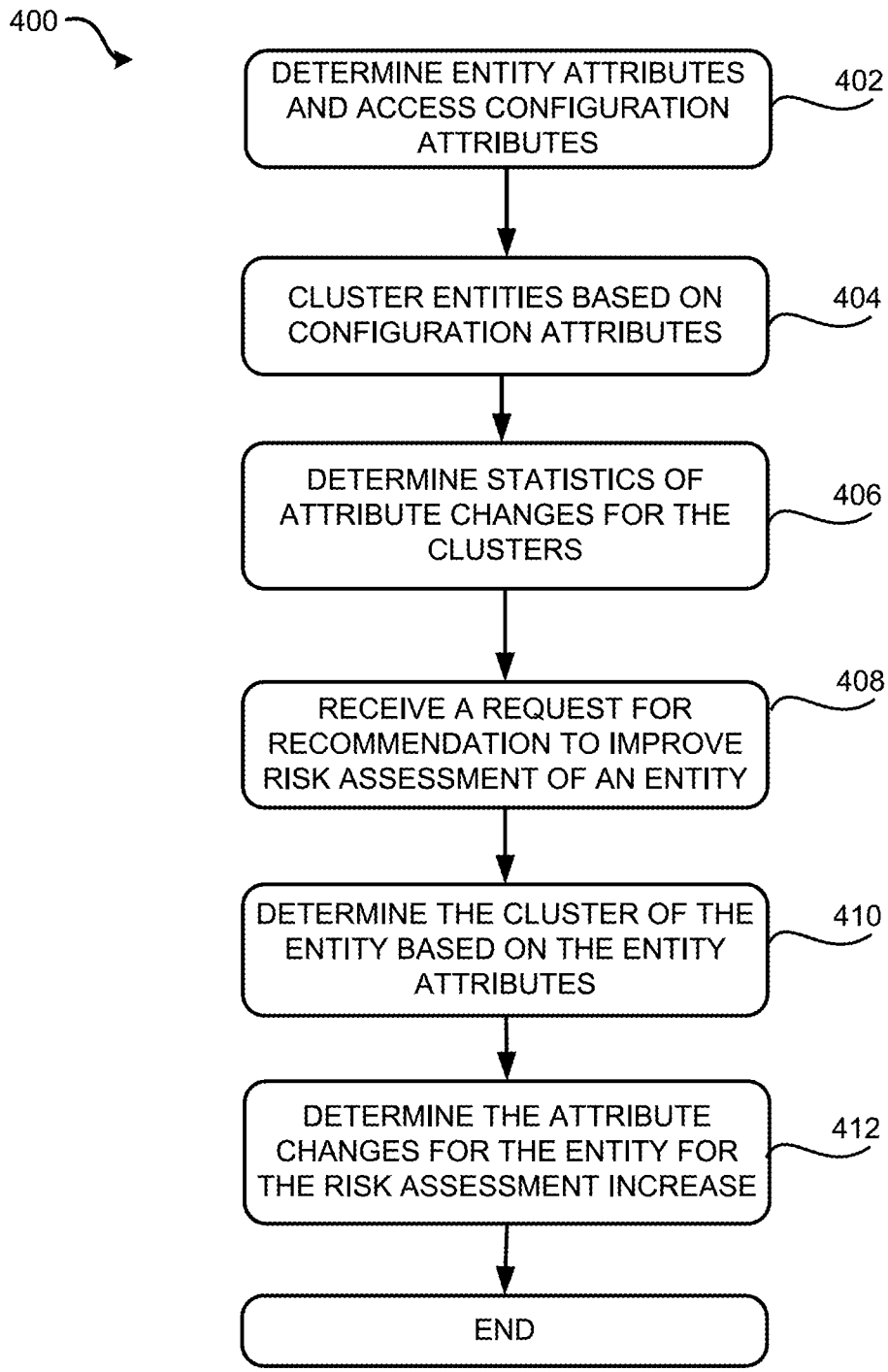
FIG. 4 is a flow chart depicting an example of a process for determining feasible actions that can be taken by an entity or with respect to an entity within a particular time period in order to improve the risk assessment for the entity, according to certain aspects of the present disclosure.

FIG. 4 is a flow chart depicting an example of a process 400 for determining feasible actions that can be taken by an entity or with respect to an entity within a particular time period in order to modify a risk assessment for the entity (e.g., improve a consumer's credit score) using the framework presented above. For illustrative purposes, the process 400 is described with reference to implementations described with respect to various examples depicted in FIGS. 1-3. Other implementations, however, are possible. The operations in FIG. 4 are implemented in program code that is executed by one or more computing devices, such as the automated modeling code 114 that is executed by an entity assessment server 118. In some aspects of the present disclosure, one or more operations shown in FIG. 4 may be omitted or performed in a different order. Similarly, additional operations not shown in FIG. 4 may be performed.

At block 402, the process 400 involves determining entity attributes $\vec{X}$ to be used to determine the feasible actions of the entity and accessing a set of configuration attributes. A configuration attribute can be an attribute that defines, at least in part, an n-dimensional space for computing risk-mitigation recommendations in process 300. The configuration attributes include at least some of the historical attribute data 124 obtained from the risk data repository 122. As an example, the configuration attributes can be a set of consumer-level attributes (e.g., Equifax® Advanced Decisioning Attributes ("ADA"), Equifax® Dimensions™ ("DIM") attributes, etc.).

In some aspects, the entity assessment server can pre-process the set of configuration attributes. Examples of this pre-processing include standardizing the attribute data for the training entity attributes using z-score transformations; approximating a longitudinal covariance matrix by computing a sample longitudinal covariance of sub-samples, where the sub-samples are defined by a cluster analysis described herein; treating consumer-level attributes as continuous random variables; imputing default or Missing values to 0 or 1 as appropriate; and applying a correlation filter to the training attributes to eliminate highly correlated attributes from the set of training attributes, which can reduce the column dimension of a cluster analysis described herein, can reduce the risk of matrix inverse problems, or both.

At block 404, the process 400 involves clustering entities into clusters based on the configuration attributes, i.e., clustering historical attribute vectors with values of the configuration attributes of the entities. In some examples, the clustering is performed based on configuration attributes at time T1. In other examples, the clustering can be performed on time-series data of the configuration attributes. In some implementations, the cluster analysis is performed in a high degree of granularity so that the variation in feasible attribute changes across the range of the data can be represented accurately. The number of clusters can be large or small as long as each cluster has enough data points to reasonably approximate the centroid of cluster k, $\vec{c}_k$, and longitudinal covariance matrix for cluster k, $\Sigma_k$, with confidence and that there are enough clusters to adequately capture nuances in the data. Clustering techniques, such as k-means or hierarchical clustering can be utilized to perform the clustering. In one example, the clustering is performed by maximizing the number of clusters while maintaining a sufficient number of data points in each cluster (e.g., higher than a threshold number of data points) so that the underlying distribution of each cluster can be accurately represented by the data points.

By performing the clustering, different entities are classified into different clusters based on their respective entity attributes. As will be discussed in the following, for a target entity to be evaluated, the recommendation computing system 130 can classify the target entity into one of these clusters based on the entity's similarity to historical entities involved in the clustering analysis (i.e., the entities whose historical attribute data was grouped into the clusters). Attribute changes of the historical entities in a particular cluster to which a target entity is assigned can be analyzed to facilitate the determination of the attribute change and thus the actions to be taken by the target entity.

At operation 406, the process 400 involves determining statistics of attribute changes for each of the clusters. Denote the attribute change from time T1 to time T2 for an entity as $\vec{\delta}_{T1} \overset{\text{def}}{=} \vec{X}^{T2} - \vec{X}^{T1}$. For each cluster k, the recommendation computing system 130 computes the mean $\vec{\mu}_k$, covariance $\Sigma_k$, and precision matrix $P_k = \Sigma_k^{-1}$ of the distribution of $\vec{\delta}_{T1}$. In other words, while the clustering is performed based on the configuration attributes at time T1, the statistics are calculated for the attribute changes from time T1 to T2.

At operation 408, the process 400 involves receiving a request to generate actionable recommendations for a target entity to improve a risk assessment (e.g., a consumer's credit score) within the time period from the current time T1 to a future time T2. The request may specify a target risk assessment score, such as a target credit score. In some examples, instead of or in addition to specifying the target credit score, the request may ask for the maximum credit score that can be achieved during the time period.

At operation 410, the process 400 involves determining the cluster of the entity based on the entity's attribute values at time T1. The entity's attribute values at time T1 are denoted as $\vec{X}^{T1}$. For example, the entity can be classified into a cluster that has the smallest Euclidean distance between $\vec{X}^{T1}$ and the cluster's centroid $\vec{c}_k$. Other types of distances can also be utilized to classify the entity into a cluster.

At operation 412, the process 400 involves determining the attribute changes that can improve the risk assessment score, either by reaching a specified target risk assessment score or by maximizing the score increase. For instance, in an example involving a request for a target credit score of an entity, a target score increase $\Delta C$ can be determined based on the current credit score of the entity. In this case, the attribute changes from T1 to T2, $\vec{\delta}_{T1}$, can be determined by solving the optimization problem shown in Eqns. (2) and (3), which takes the following form in this scenario:

$$\min: T^2 \overset{\text{def}}{=} (\vec{\delta}_{T1} - \vec{\mu}_k)^T P_k (\vec{\delta}_{T1} - \vec{\mu}_k) \tag{6}$$

$$\text{subject to: } f(\vec{X}^{T2}) - f(\vec{X}^{T1}) \overset{\text{def}}{=} f(\vec{X}^{T1} + \vec{\delta}_{T1}) - f(\vec{X}^{T1}) \times \Delta C. \tag{7}$$

If the request is for a recommendation to obtain a maximum credit score increase, the recommendation computing system 130 can determine the attribute changes by solving the optimization problem shown in Eqns. (4) and (5), which takes the following form in this scenario:

$$\max: f(\vec{X}^{T2}) - f(\vec{X}^{T1}) \overset{\text{def}}{=} f(\vec{X}^{T1} + \vec{\delta}_{T1}) - f(\vec{X}^{T1}) \tag{8}$$

$$\text{subject to: } T^2 \overset{\text{def}}{=} (\vec{\delta}_{T1} - \vec{\mu}_k)^T P_k (\vec{\delta}_{T1} - \vec{\mu}_k) \leq b, \tag{9}$$

The determined attribute changes can be utilized to generate the recommended actions for the entity to take before time T2 to achieve the credit score improvement. In some aspects, the operations described above with respect to Equations (6)-(9) can be used to implement the step for optimizing an objective function having a term for the attribute-change vector.

The recommended actions or attribute changes determined by process 400 are operable if the time period from T1 to T2 is relatively short, such as one month or two months. If this time period is long, such as one year, two years, or even five years, the recommended actions or attribute changes determined by process 400 become a long term goal and are less operable and thus less useful for the entity. To provide actionable recommendations for a long term goal on credit score increase, the recommendation computing system 130 can divide the problem into multiple sub-problems each for a short term period. For example, to increase an entity's credit score over the next one year, the recommendation computing system 130 can provide recommendations for each month out of the 12 months. These month-to-month recommendations are more operable than recommendations for the entire 12 months.

Figure 5:
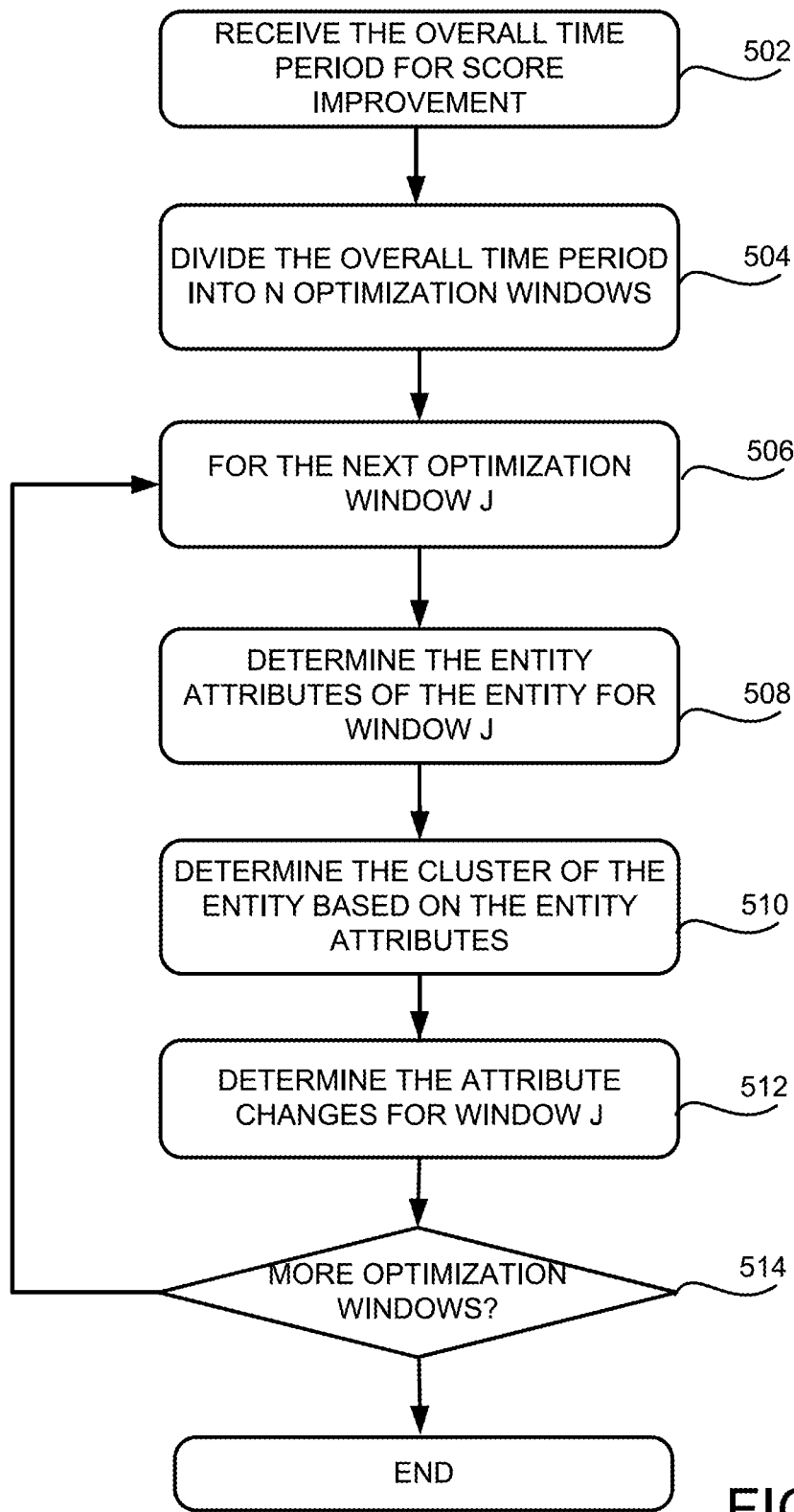
FIG. 5 is a flow chart depicting an example of a process for determining feasible actions that can be taken by an entity or with respect to an entity in a set of shorter time periods in order to improve the risk assessment for the entity over a longer time period that encompasses the set of shorter time periods, according to certain aspects of the present disclosure.

FIG. 5 is a flow chart depicting an example of a process 500 for determining feasible actions that can be taken by an entity or with respect to an entity in a set of shorter time periods in order to modify a risk assessment for the entity (e.g., improve a consumer's credit score) over a longer time period that encompasses the set of shorter time periods. For illustrative purposes, the process 500 is described with reference to implementations described with respect to various examples depicted in FIG. 1. Other implementations, however, are possible. The operations in FIG. 5 are implemented in program code that is executed by one or more computing devices, such as the automated modeling code 114 that is executed by an entity assessment server 118. In some aspects of the present disclosure, one or more operations shown in FIG. 5 may be omitted or performed in a different order. Similarly, additional operations not shown in FIG. 5 may be performed.

At block 502, the process 500 involves receiving the overall time period for credit score increase. This overall time period may be specified in a request for recommendation or set at a default value by the recommendation computing system 130. At block 504, the process 500 involves dividing the overall time period into N optimization windows. For example, a 12-month overall time period can be divided into 12 one-month optimization windows. The overall time period can thus be represented using the N optimization windows $[t_0, t_1], [t_1, t_2], \ldots, [t_{N-1}, t_N]$, where $t_0$ represents the current time and $[t_{j-1}, t_j]$ is the j-th optimization window. The N optimization windows can have the same or different lengths.

At block 506, the process 500 involves examining the next optimization window j. At block 508, the recommendation computing system 130 determines the entity attributes for optimization window j, denoted as $\vec{X}^{t_{j-1}}$. $\vec{X}^{t_{j-1}}$ can be determined based on the entity attributes at the current time $t_0$, $\vec{X}^{t_0}$ and the attribute changes in the previous j−1 optimization windows, i.e. $\tilde{X}^{t_{j-1}} - \tilde{X}^{t_0} + \vec{\delta}_{t_1} + \vec{\delta}_{t_2} + \ldots + \vec{\delta}_{t_{j-1}}$. At block 510, the process 500 involves determining a cluster for the entity based on $\vec{X}^{t_{j-1}}$. In some examples, the clusters are generated according to blocks 402 to 406 described above with regard to FIG. 4. The cluster that has the smallest Euclidean distance between its centroid $\vec{c}_k$ and $\vec{X}^{t_{j-1}}$ is determined as the cluster of the entity for the j-th optimization window.

At block 512, the process 500 involves determining the attribute changes for the current optimization window, $\vec{\delta}_{t_j}$, by solving the following optimization problem:

$$\min: (\vec{\delta}_{t_j} - \vec{\mu}_{k_j^*})^T P_{k_j^*} (\vec{\delta}_{t_j} - \vec{\mu}_{k_j^*}) \quad (10)$$

$$\text{subject to: } f(\tilde{X}^{t_j}) - f(\tilde{X}^{t_{j-1}}) \overset{\text{def}}{=} f(\tilde{X}^{t_{j-1}} + \vec{\delta}_{t_j}) - f(\tilde{X}^{t_{j-1}}) = \Delta C_j. \quad (11)$$

where $\Delta C_j$ is the target credit score increase for optimization window j. If the request has specified the overall target score increase, $\Delta C_j$ can be determined such that the summation of the increase for the N optimization windows equals to the overall target score increase. $\Delta C_j$ for different optimization windows might be the same or different.

Alternatively, the attribute changes for the current optimization window may be determined by solving the following optimization problem in a way similar to the problem formulated in Eqns. (8) and (9):

$$\max: f(\tilde{X}^{t_j}) - f(\tilde{X}^{t_{j-1}}) \overset{\text{def}}{=} f(\tilde{X}^{t_{j-1}} + \vec{\delta}_{t_j}) - f(\tilde{X}^{t_{j-1}}) \quad (12)$$

$$\text{subject to: } T^2 \overset{\text{def}}{=} (\vec{\delta}_{t_j} - \vec{\mu}_{k_j^*})^T P_{k_j^*} (\vec{\delta}_{t_j} - \vec{\mu}_{k_j^*}) \leq b_j. \quad (13)$$

At block 514, the process 500 involves determining if there are more optimization windows to be evaluated. If so, the process 500 involves evaluating the next optimization windows starting from block 506. The process 500 ends if there are no more optimization windows to be evaluated. The attribute changes generated for each optimization window [$\vec{\delta}_{t_1}, \vec{\delta}_{t_2}, \ldots, \vec{\delta}_{t_N}$] provide step-by-step actions for the entity to follow in order to improve its credit score.

As discussed above, the optimization problems in Eqns. (2)-(13) can be modified to include more constraints based on the type of attributes. For instance, if the entity attributes have integer-valued attributes, an integer constraint can be added to each of the optimization problems formulated above to enforce the value of the attributes to be an integer. Likewise, as discussed above, some attributes involve time change over time. For these attributes, auto-incremented constraints or auto-decremented constraints can be added.

Additional feasibility constraints can also be added. For example, an autoencoder can be built and trained using configuration attributes to capture the underlying characteristics of the entity attributes. With the autoencoder, the recommendation computing system 130 can evaluate whether the constraint change $\vec{\delta}$ is feasible. The recommendation computing system 130 can input the entity attributes with the determined attribute change, i.e. $\vec{X}^1 + \vec{\delta}$, to the autoencoder and examine the difference between the output of the autoencoder and $\vec{X}^1 + \vec{\delta}$. A constraint of limiting this difference to be below a threshold can be added to the above optimization problems to ensure the feasibility of the attribute changes. Alternatively, an item involving this difference may be added to the objective function so that this difference is minimized.

Further adjustments may be performed to improve the accuracy of the attribute change determination process. For example, binary variables have a different distribution from continuous variables. When calculating the Mahalanobis distance as described above, a continuous variable may be normalized to have a zero mean and a standard deviation of one so that they are comparable. Binary variables, however, cannot be normalized in the same way. To make the binary variables to be comparable with continuous variables, the recommendation computing system 130 can convert binary variables to a proper scale so that they behave similarly to the continuous variables. Another adjustment may involve using the reference vector $\vec{\mu}_k$ in $T^2$ as the baseline and the attribute change can be measured relative to this baseline. This allows entity attributes that are not related to time to remain constant.

Determining the Impact of the Attributes in the Attribute Change Vector

Path integrated gradients can be defined to additively explain the change in a scoring surface along a given path. The path integrated gradients along a given path $\gamma$ in the $i^{th}$ dimension cam be defined as defined as $$PathIntegratedGrads_i^\gamma(x) \overset{\text{def}}{=} \int_{\alpha=0}^1 \frac{\partial f(\gamma(\alpha))}{\partial \gamma_i(\alpha)} \frac{\partial \gamma_i(\alpha)}{\partial \alpha} d\alpha. \quad (14)$$

This definition can be applied to additively explain the optimal path obtained by iteratively applying the method described herein for one window to compute a sequence of attribute changes $\vec{\delta}_{t_j}$, j=1 to N, to achieve a total score increase of C. For example, each $\vec{\delta}_{t_j}$ can be the optimal change required to achieve a score increase of C/N.

Recall that the monthly change in the domain space of the optimal path is a straight line path from $\tilde{X}^{t_{j-1}}$ to $\tilde{X}^{t_{j-1}} + \vec{\delta}_{t_j}$. Therefore, equation (14) along the optimal path $\gamma$ from $\tilde{X}^{t_0}$ to $\tilde{X}^{t_0} + \sum_{j=1}^N \vec{\delta}_{t_j}$ can be computed by summing the integrated gradients along each straight-line portion of the path:

$$PathIntegratedGrads_i^\gamma \left( \vec{X}^{t_0} + \sum_{j=1}^N \vec{\delta}_{t_j} \right) = \quad (15)$$

$$\sum_{j=1}^N (\vec{\delta}_{t_j})_i \int_{\alpha=0}^1 \left( \nabla_x f \left( \tilde{X}^{j-1} + \alpha \vec{\delta}_{t_j} \right) \right)_i d\alpha$$

where $(\vec{\delta}_{t_j})_i \overset{\text{def}}{=}$ the $i^{th}$ component of the vector $\vec{\delta}_{t_j}$ and $(\nabla_x f(\tilde{X}^{t_{j-1}} + \alpha \vec{\delta}_{t_j}))_i \overset{\text{def}}{=}$ the $i^{th}$ component of the gradient of f evaluated at $\tilde{X}^{t_{j-1}} + \alpha \vec{\delta}_{t_j}$. The sum of the PathIntegratedGrads gives the total score increase moving from $\tilde{X}^{t_0}$ to $\tilde{X}^{t_0} + \sum_{j=1}^N \vec{\delta}_{t_j}$:

$$\sum_i PathIntegratedGrads_i^\gamma \left( \vec{X}^{t_0} + \sum_{j=1}^N \vec{\delta}_{t_j} \right) = \quad (16)$$

$$f\left(\vec{\tilde{X}}^{t_o} + \sum_{j=1}^{N} \vec{\delta}_{t_j}\right) - f(x_o) = C.$$

the desired total score increase. The PathIntegratedGrads$_i^\gamma$($\tilde{X}^{t_o}+\Sigma_{j=1}^N \vec{\delta}_{t_j}$) is the contribution of the $i^{th}$ variable to the total score increase. This value may be positive or negative, where large positive values indicate important variables to the score increase. Negative values acknowledge that some steps may require negatively impacting some variables so that more important variables may positively impact the score. In this way, explanatory data can be generated to indicate the impact of each attribute or variable value in the attribute changes $\vec{\delta}_{t_j}$, j=1 to N, on modifying the current risk assessment score to the target risk assessment score.

Solving the Optimization Problem of Finding the Optimal Path

The optimization problems discussed above with respect to FIGS. 2-5 can be solved using any existing optimization algorithms depending on the form of the functions, such as f(·), involved in the problem and the value of the entity attributes. The following describes several examples for solving the optimization problem for different forms of the function f(·) In the following, all vectors are vertical column vectors and the gradient is a horizontal row vector. $\vec{\delta}$ is denoted as $\delta$ below for simplicity.

Optimize L2-norm distance traveled for a linear model. In the example where the scoring function is a linear function f(·): $\mathbb{R}^n \to \mathbb{R}$ given by f(x)=β'x and the δ step increments are normally distributed δ~N(0, I) with covariance matrix S=$I_{n \times n}$ and mean μ=$0_{n \times 1}$, an optimization problem similar to that of Eqns. (2) and (3) but using L2-norm distance can be formulated as:

$$\min \|\delta\|_2^2 \quad (17)$$

$$s.t. f(x+\delta)-f(x)=\beta'\delta=C. \quad (18)$$

This problem can be solved by the method of Lagrange multipliers, which includes forming the Lagrangian L=$\|\delta\|_2^2$+λ(β'δ−C) and taking the partial derivatives:

$$\nabla_\delta L = 2\delta' + \lambda\beta' \quad (19)$$

$$\frac{\partial L}{\partial \lambda} = \beta'\delta - C. \quad (20)$$

Setting Equation (19) equal to 0 gives $$\delta = -\frac{\lambda\beta}{2}.$$

Substituting into equation (20) and setting it equal to 0 gives $$C = \beta'\delta = -\frac{\lambda}{2}\beta'\beta = -\frac{\lambda}{2}\|\beta\|_2^2. \quad (21)$$

Solving for λ and δ gives $$\lambda = \frac{-2C}{\|\beta\|_2^2} \quad (22)$$

and $$\delta = \frac{C}{\|\beta\|_2^2}\beta. \quad (23)$$

So in an unbounded domain, the optimal path moves in the direction of the unit gradient of f a magnitude of C units.

Optimize Mahalanobis distance traveled for a linear model. In this example, the optimization problem includes an ellipsoid objective function specified by the Mahalanobis distance with a linear score increase constraint:

$$\min (\delta-\mu)'S^{-1}(\delta-\mu) \quad (24)$$

$$s.t. f(x+\delta)-f(x)=\beta'\delta=C. \quad (25)$$

Here, μ=$\mathbb{E}$ (δ|X32 x) and S=cov (δ|X=x). Both μ and S can be computed a priori in development and stored for look-up access, or can be computed in run-time using k-nearest neighbors. This problem can be transformed into a spherical objective function by applying Cholesky decomposition and making an appropriate substitution. First, Cholesky decompose S$^{-1}$=L'L. Note that S is positive semi-definite since it is a covariance matrix. In fact, as long as linear dependent variables are not included in the model, it is positive definite and thus S$^{-1}$ is positive definite. Therefore, L exists and is unique. Next, make the substitution u=L(δ−μ). This transforms the objective (24) into $$(\delta-\mu)'S^{-1}(\delta-\mu)=(\delta-\mu)'L'L(\delta-\mu)=(L(\delta-\mu))'L(\delta-\mu)=$$
$$u'u = \|u\|_2^2 \quad (26)$$

and the optimization problem becomes $$\min \|u\|_2^2 \quad (27)$$

$$s.t. f(x+\delta)-f(x)=\beta'\delta=\beta'(u+L^{-1}u)=C \quad (28)$$

Rearranging the terms of the optimization problem gives $$\min \|u\|_2^2 \quad (29)$$

$$s.t. ((L^{-1})'\beta)'u=C-\beta'\mu. \quad (30)$$

Referring back to equation (23), we get $$u = \frac{C - \beta'\mu}{\|(L^{-1})'\beta\|_2^2}(L^{-1})'\beta. \quad (31)$$

So $$\delta = \mu + L^{-1}u = u + \frac{C - \beta'\mu}{\|(L^{-1})'\beta\|_2^2}L^{-1}(L^{-1})'\beta \quad (32)$$

Now $S^{-1} = L'L$ implies (33)

$$S = (L'L)^{-1} = L^{-1}(L')^{-1} = L^{-1}(L^{-1})' \text{ and}$$

$$\|(L^{-1})'\beta\|_2^2 = ((L^{-1})'\beta)'((L^{-1})'\beta) = \beta'L^{-1}(L^{-1})'\beta = \beta'S\beta.$$

Therefore, equation (32) can be simplified to $$\delta = \mu + \frac{C - \beta'\mu}{\beta'S\beta}S\beta. \quad (34)$$

The solution δ is a rotation of the gradient of f to account for the geometry imposed by S. This solution depends on query access to f and $\nabla_x f$ and look-up access or k-nearest neighbor computation of S. This leads to a simple implementation and real-time solution of the problem.

Non-linear Model. If f is a differentiable and monotonic score function, the problem of minimizing the Mahalanobis distance subject to a score increase of C becomes $$\min g(\delta) \stackrel{def}{=} (\delta-\mu)'S^{-1}(\delta-\mu) \qquad (35)$$

$$s.t. h(\delta) \stackrel{def}{=} f(x+\delta)-f(x)-C=0. \qquad (36)$$

The method of sequential quadratic programming can be applied to solve this optimization problem. Let the initial estimate of $\delta$ be $\delta_0=\mu$ (since the expected value of $\delta$ is $\mu$) and each subsequent estimate $\delta_{k+1}$ of $\delta$ be $\delta_{k+1}=\delta_k+d_k$. Here, k refers to the k-th iteration of the process. Taylor series for the objective and constraint at $\delta_{k+1}=\delta_k+d_k$ is:

$$g(\delta_k+d_k)=g(\delta_k)+\nabla_\delta g(\delta_k)d_k+\tfrac{1}{2}d'_k\nabla_\delta^2 g(\delta_k)d_k+\ldots =(\delta_k-\mu)'S^{-1}(\delta_k-\mu)+2(\delta_k-\mu)'S^{-1}d_k+d'_kS^{-1}d_k+\ldots \qquad (37)$$

and $$h(\delta_k+d_k)=h(\delta_k)+\nabla_\delta h(\delta_k)d_k+\ldots =f(x+\delta_k)-f(x)-C+\nabla_x f(x+\delta_k)d_k+\ldots =0. \qquad (38)$$

The approximate optimization problem is then $$g(\delta_k)+\min 2(\delta_k-\mu)'S^{-1}d_k+d'_kS^{-1}d_k \qquad (39)$$

$$s.t. \nabla_x f(x+\delta_k)d_k=C-(f(x+\delta_k)-f(x)). \qquad (40)$$

This sub-problem can be transformed into the form disclosed above by making the substitution $d_k=u-(\delta_k-\mu)$ to eliminate the linear term in the objective function. Making the substitution gives $$2(\delta_k-\mu)'S^{-1}d_k + d'_kS^{-1}d_k = \qquad (41)$$
$$2(\delta_k-\mu)'S^{-1}(u-(\delta_k-\mu))+(u-(\delta_k-\mu))'S^{-1}(u-(\delta_k-\mu))=$$
$$u'S^{-1}u+2(\delta_k-\mu)'S^{-1}u-(\delta_k-\mu)'S^{-1}u-u'S^{-1}(\delta_k-\mu)+$$
$$(\delta_k-\mu)'S^{-1}(\delta_k-\mu)-2(\delta_k-\mu)'S^{-1}(\delta_k-\mu)=$$
$$u'S^{-1}u-(\delta_k-\mu)'S^{-1}(\delta_k-\mu),$$

where the last line follows from the fact that $(\delta_k-\mu)'S^{-1}u=u'S^{-1}(\delta_k-\mu)$ since $S^{-1}$ is symmetric (S is a covariance matrix and hence symmetric, and the inverse of a symmetric matrix is symmetric). So the sub-problem can be written in terms of the variable u as $$g(\delta_k)-(\delta_k-\mu)'S^{-1}(\delta_k-\mu)+\min u'S^{-1}u \qquad (42)$$

$$s.t. \nabla_x f(x+\delta_k)u=C-(f(x+\delta_k)-f(x))+\nabla_x f(x+\delta_k)(\delta_k-\mu). \qquad (43)$$

This sub-problem now has the form of the problem shown in equations (24) and (25) and using equation (34) the solution is $$u = \frac{C-(f(x+\delta_k)-f(x))+\nabla_x f(x+\delta_k)(\delta_k-\mu)}{\nabla_x f(x+\delta_k)S\nabla_x f(x+\delta_k)'} S\nabla_x f(x+\delta_k)' \qquad (44)$$

and transforming back to the original variable $d_k$ $$d_k = u - (\delta_k-\mu) = \qquad (45)$$
$$\frac{C-(f(x+\delta_k)-f(x))+\nabla_x f(x+\delta_k)(\delta_k-\mu)}{\nabla_x f(x+\delta_k)S\nabla_x f(x+\delta_k)'} S\nabla_x f(x+\delta_k)' - (\delta_k-\mu).$$

After each iteration k, the above process can be repeated for next iteration k+1 by using $\delta_{k+1}=\delta_k+d_k$.

Improved first order approximation by score covariance. A limitation of the approximating solution equation (34) is the first order approximation of f, especially when a component of $\nabla_x f$ is 0. As a simple example, if $f(x_1, x_2)=x_1^3+0.1x_2$, then $(\nabla_x f)(0, x_2)=(0,0.1x_2)$. Using equation (45), the algorithm will never choose to move in the $x_1$ direction even though $x_1$ will dominate the score as $x_1$ increases. The solution provided by equation (45) is not wrong in the sense that it still provides a score increase as the consumer improves their credit profile. However, it will never converge to the maximum possible score increase. Moving to a second order approximation eliminates the simple closed form solution, and instead requires a non-linear optimizer such as Sequential Quadratic Programming (SQP). This is not ideal for run-time solutions.

Instead of using a second order approximate, a method is used to detect when there is potential score improvement in direction $x_i$ even when the $\partial f/\partial x_i=0$ at a point x. For a linear score $f(x)=\beta'x$, the covariance between a variable and the linear score is $$cov(X_i, \beta'X)=\mathbb{E}((X_i-\bar{x}_i)(\beta'X-\bar{\beta}'x))=\mathbb{E}((X_i-\bar{x}_i)\Sigma_j\beta_j(X_j-\bar{x}_j))=\Sigma_j\beta_j\mathbb{E}((X_i-\bar{x}_i)(X_j-\bar{x}_j))=\beta' cov(X_i, X). \qquad (46)$$

Here, $cov(X_i, X)$ is the column vector of covariances of the $i^{th}$ variable with each of the variables and is thus the $i^{th}$ column in the covariance matrix of X. So the covariance vector comprised of the covariance between each variable and the score is $$cov(X, \beta'X)'=\beta' cov(X) \qquad (47)$$

which implies $$\beta=cov(X)^{-1} cov(X,\beta'X). \qquad (48)$$

Replace $\beta'X$ with the non-linear score f(x) on the right hand side to get $$\beta=cov(X)^{-1} cov(X,f(X)). \qquad (49)$$

By sampling points around a given location x, the gradient can be approximated by equation (49). Let X denote a sample of points around x. By equation (49), $$(\nabla_x f)(x)\approx cov(X)^{-1} cov(X,f(X)), \qquad (50)$$

where the actual non-linear score f is used on the right hand side. When f is linear, equation (50) is exact. When f is non-linear, the right hand side of equation (50) allows to capture that there is potential score improvement in direction $x_i$ even when $\partial f/\partial x_i=0$ at a point x. If any component of the partial derivative is 0, the gradient will be replaced with the estimate (50).

Improved accuracy by optimizing step size. The convergence accuracy can be improved by ensuring that the first order approximation of f reasonably approximates the constraint $f(x+\delta)-f(x)-C=0$. Instead of making the update $\delta_{k+1}=\delta_k+d_k$ as described above, the magnitude of the update step can be varied to $\delta_{k+1}=\delta_k+s_kd_k$, where $0\le s_k\le 1$ satisfies $$\min (\delta_{k+1}-\mu)'S^{-1}(\delta_{k+1}-\mu)+P|f(x+\delta_{k+1})-f(x)-C|, \qquad (51)$$

where P is a large constant. Equation (51) produces a large penalty if the first order approximation of the score produces a score constraint $f(x+\delta)-f(x)-C=0$ that is not satisfied, resulting in a step $s_k\ll 1$. As the solution converges, the first order approximation of the score becomes more accurate and the constraint $f(x+\delta)-f(x)-C$ converges to 0. In fact, for large enough P, $\delta^*$ is also the solution to equation (51).

The improvement now involves solving two sub-problems. The first sub-problem finds the update step direction $d_k$ and the second sub-problem finds the step magnitude $s_k$. Equation (51) is a function of one variable and can be optimized by any number of algorithms. In Octave, fininbnd can be used to find the magnitude between 0 and 1 that minimizes the objective (51).

Boundary box constraints. Suppose the attributes have the box constraints $lb_i \leq x_i \leq ub_i$ and all box constraints are finite. The optimization problem is then $$\min (\delta-\mu)'S^{-1}(\delta-\mu) \quad (52)$$

$$s.t. f(x+\delta)-f(x)-C=0. \quad (53)$$

$$\text{and } lb \leq x+\delta \leq ub. \quad (54)$$

Until a box constraint condition is violated, the update $\delta_{k+1}=\delta_k+s_k d_k$ can be made from iteration to iteration. Suppose at step k, x is changed to $x+\delta_k$ and hits at least one boundary box constraint. For convenience of notation, below shows the case that the first m coordinates have reached their respective box constraint, leaving the remaining n−m coordinates inside the box constraints at step k. The idea is that for a monotonic scoring function, it is enough to only take steps in the remaining n−m dimensions to solve the optimization problem. Let the update step after we hit the boundary be $$\delta_{k+1} = \delta_k + \begin{bmatrix} 0 \\ \gamma \end{bmatrix}, \quad (55)$$

where 0 is the zero vector of size m×1 representing the dimensions at the boundary that will not be updated and γ is the (n−m)×1 vector of dimensions not at the boundary that may be updated.

Now consider the objective equation (35) and score constraint (36) for $\delta_{k+1}$, and simplify each in terms of γ. First, the square symmetric matrix $S^{-1}$ can be partitioned into blocks representing the free and non-free rows and columns by $$S^{-1} = \begin{bmatrix} A_{m \times m} & B_{m \times (n-m)} \\ B'_{(n-m) \times m} & D_{(n-m) \times (n-m)} \end{bmatrix}. \quad (56)$$

Using this block matrix notation, the objective function can be simplified in terms of γ, where the symmetry of $S^{-1}$ and thus D is used throughout.

$$(\delta_{k+1} - \mu)'S^{-1}(\delta - \mu) = \left(\delta_k + \begin{bmatrix} 0 \\ \gamma \end{bmatrix} - \mu\right)'\begin{bmatrix} A & B \\ B' & D \end{bmatrix}\left(\delta_k + \begin{bmatrix} 0 \\ \gamma \end{bmatrix} - \mu\right) =$$

$$\left(\begin{bmatrix} 0 \\ \gamma \end{bmatrix} - \mu + \delta_k\right)'\begin{bmatrix} A & B \\ B' & D \end{bmatrix}\left(\begin{bmatrix} 0 \\ \gamma \end{bmatrix} - (\mu + \delta_k)\right)$$

$$= \begin{bmatrix} 0 \\ \gamma \end{bmatrix}'\begin{bmatrix} A & B \\ B' & D \end{bmatrix}\begin{bmatrix} 0 \\ \gamma \end{bmatrix} - \begin{bmatrix} 0 \\ \gamma \end{bmatrix}'\begin{bmatrix} A & B \\ B' & D \end{bmatrix}(\mu - \delta_k) - \quad (57)$$

$$(\mu - \delta_k)'\begin{bmatrix} A & B \\ B' & D \end{bmatrix}\begin{bmatrix} 0 \\ \gamma \end{bmatrix} + (\mu - \delta_k)'\begin{bmatrix} A & B \\ B' & D \end{bmatrix}(\mu - \delta_k).$$

Each of these four terms is explained blew. The first term simplifies as $$\begin{bmatrix} 0 \\ \gamma \end{bmatrix}'\begin{bmatrix} A & B \\ B' & D \end{bmatrix}\begin{bmatrix} 0 \\ \gamma \end{bmatrix} = [0' \ \gamma']\begin{bmatrix} A & B \\ B' & D \end{bmatrix}\begin{bmatrix} 0 \\ \gamma \end{bmatrix} \quad (58)$$

$$= [0'A + \gamma'B' \ \ 0'B + \gamma'D]\begin{bmatrix} 0 \\ \gamma \end{bmatrix}$$

$$= [\gamma'B' \ \ \gamma'D]\begin{bmatrix} 0 \\ \gamma \end{bmatrix}$$

$$= \gamma'B'0 + \gamma'D\gamma$$

$$= \gamma'D\gamma$$

The second term simplifies as $$\begin{bmatrix} 0 \\ \gamma \end{bmatrix}'\begin{bmatrix} A & B \\ B' & D \end{bmatrix}(\mu - \delta_k) = [0' \ \gamma']\begin{bmatrix} A & B \\ B' & D \end{bmatrix}(\mu - \delta_k) \quad (59)$$

$$= [0'A + \gamma'B' \ \ 0'B + \gamma'D](\mu - \delta_k)$$

$$= \gamma'[B' \ D](\mu - \delta_k)$$

The third term simplifies as $$(\mu - \delta_k)'\begin{bmatrix} A & B \\ B' & D \end{bmatrix}\begin{bmatrix} 0 \\ \gamma \end{bmatrix} = (\mu - \delta_k)'\begin{bmatrix} A0 + B\gamma \\ B'0 + D\gamma \end{bmatrix} \quad (60)$$

$$= (\mu - \delta_k)'\begin{bmatrix} B \\ D \end{bmatrix}\gamma$$

The fourth term does not depend on γ and thus simplification is not needed. Plugging equations (58), (59), and (60) back into equation (57) and factoring the quadratic form gives $$(\delta_{k+1} - \mu)'S^{-1}(\delta_{k+1} - \mu) = \quad (61)$$

$$\gamma'D\gamma - \gamma'[B' \ D](\mu - \delta_k) - (\mu - \delta_k)'\begin{bmatrix} B \\ D \end{bmatrix}\gamma + (\mu - \delta_k)'S^{-1}(\mu - \delta_k) =$$

$$\gamma'D\gamma - \gamma'DD^{-1}[B' \ D](\mu - \delta_k) -$$

$$(\mu - \delta_k)'\begin{bmatrix} B \\ D \end{bmatrix}D^{-1}D\gamma + (\mu - \delta_k)'S^{-1}(\mu - \delta_k) =$$

$$\gamma'D\gamma - \gamma'D(D^{-1}[B' \ D](\mu - \delta_k)) - (D^{-1'}[B' \ D'](\mu - \delta_k))'D\gamma +$$

$$(\mu - \delta_k)'S^{-1}(\mu - \delta_k) = \gamma'D\gamma - \gamma'D(D^{-1}[B' \ D](\mu - \delta_k)) -$$

$$(D^{-1}[B' \ D](\mu - \delta_k))'D\gamma + (\mu - \delta_k)'S^{-1}(\mu - \delta_k) =$$

$$(\gamma - D^{-1}[B' \ D](\mu - \delta_k))'D(\gamma -$$

$$D^{-1}[B' \ D](\mu - \delta_k)) + (\mu - \delta_k)'S^{-1}(\mu - \delta_k) = (\gamma -$$

$$[D^{-1}B' \ I](\mu - \delta_k))'D(\gamma' - [D^{-1}B' \ I](\mu - \delta_k)) + (\mu - \delta_k)'S^{-1}(\mu - \delta_k).$$

Since the very last term in equation (61) does not depend on γ, it can be dropped from the minimization problem and the below objective function can be considered $$(\gamma - [D^{-1}B' \ I](\mu - \delta_k))'D(\gamma - [D^{-1}B' \ I](\mu - \delta_k)). \quad (62)$$

This objective has the same form as that that has been optimized above, with $new\mu = [D^{-1}B' \ I](\mu - \delta_k)$ and $newS^{-1} = D$.

The score constraint after the boundary box constraint is hit becomes:

$$0 = f(x + \delta_{k+1}) - f(x) - C =$$

$$f\left(x + \delta_k + \begin{bmatrix} 0 \\ \gamma \end{bmatrix}\right) - f(x + \delta_k) - (f(x) - f(x + \delta_k) + C) =$$

-continued $$g(0+y) - g(0) = newC,$$

where $$g(y) \stackrel{\text{def}}{=} f\left(x + \delta_k + \begin{bmatrix} 0 \\ y \end{bmatrix}\right) \text{ and } newC \stackrel{\text{def}}{=} f(x) - f(x + \delta_k) + C.$$

This score constraint also has the same form that has been considered above. The update algorithm developed for the unconstrained domain cam be applied by defining the gradient operator to be $\nabla_y g(y) =$ $$\nabla_x f\left(x + \delta_k + \begin{bmatrix} 0 \\ \gamma \end{bmatrix}\right)_{m+1:n}$$

and solving the optimization problem $$\min \ (\gamma - new\mu)' D (\gamma - new\mu) \quad (63)$$

$$s.t. \ g(0+\gamma) - g(0) = newC. \quad (63)$$

Thus, the process can involve iteratively update the remaining dimensions until another box constraint is hit, reducing again and repeating. Under suitable conditions on f, this method will converge to the optimal $\delta$ that also satisfies the box constraints, or the method will reach the maximum score location and a score increase of C is not possible. Note that, when the process first began the walk, $\delta$ is initialized as $\delta_0 = \mu$ so that it is within the ellipsoid constraint. For these subsequent applications of the algorithm where some dimensions are held at the boundary of a box constraint, the initialization only involves initializing $\gamma_0 = \vec{0}$, since it is already in the ellipsoid.

Recall that the assumption is made that the first m coordinates were at a boundary and the remaining n−m were still inside the boundaries and free to move. This assumption was only important for ease of notation. In general, in the reduced optimization problem (63), D is the (n−m)×(n−m) matrix of entries from $S^{-1}$ that correspond to the free rows and columns, while B is the m×(n−m) matrix of entries from $S^{-1}$ that correspond to the non-free rows and free columns. The new score constraint function is a function of the n−m free variables and the gradient is the corresponding components of the gradient of f.

Convergence Criteria. The algorithm has converged when the update $d_k = \vec{0}$. Therefore, it is suitable to run the algorithm until $\|d_k\|_2 < \varepsilon$ for a given tolerance $\varepsilon$. Please note that the step magnitude adjustment is not considered when considering convergence. In a properly converged solution, the step magnitude adjustment converges to 1 and artificially deflating convergence by considering the norm of $s_k d_k$ instead should be avoided.

Table 1 shows an outline of the optimal path algorithm. If f is a continuously differentiable, monotonic score function, then the optimal path algorithm converges to the optimal solution $\delta^*$.

TABLE 1

1. Initialize $\delta_0 = \mu$ initially, or $\delta_0 = \vec{0}$ in the recursive step after a boundary constraint is hit.
2. Compute equation (45) to get the update direction $d_k$. Apply the methods of section "improved first order approximation by score covariance" if any component of the gradient of f at the current location is 0.
3. Compute equation (51) to get the update magnitude $s_k$ for the unconstrained domain problem.
4. Compute the magnitude $t_i$, $t_i \geq 0$, required for the update to reach the boundary of the $i^{th}$ box constraint in the direction of $d_k$.
5. The update magnitude is $s_k = \min(s_k, t_1, \ldots, t_n)$.
6. Make the update $\delta_{k+1} = \delta_k + s_k d_k$.
7. If $x + \delta_{k+1}$ hits a boundary box constraint, recursively call the algorithm to update the remaining dimensions with new$\mu$, new$S^{-1}$, newC, and g defined in section "boundary box constraints."
Repeat until $\| d_k \|_2 < \varepsilon$ or a boundary box constraint is hit.

Examples of Defining a Metric on a Feature Space

The following discussion uses, for illustrative purposes, examples such as credit scores and associated attributes. But, in various aspects, the concepts and processes described herein can be applied when determining how to modify the actions of entities in other environments. Examples of entities in other environments include a machine or set of machines in an industrial environment, an online computing service within a secure computing environment, etc.

In various aspects described herein, a "shortest" path or "closest" point in the attribute/feature space can be described using a metric that captures what movements in the feature space are feasible for an entity (e.g., a consumer). As an example with respect to credit scoring, observing another consumer with an alternative feature vector does not necessarily identify a feasible destination point for a given consumer. For instance, the addition of more credit lines to a consumer's report or the removal of bankruptcy (which are not readily removed after first appearing on one's credit report) are infeasible movements within an attribute (or "feature") space for modeling attribute values indicative of financial health.

To quantify feasible movements in feature space, the recommendation computing system 130 can use a covariance matrix of within-subject month-on-month (or quarter-on-quarter, etc.) changes in the feature vector:

$$\Sigma = \text{Var}(X_{it_j} - X_{it_{j-1}}).$$

This covariance matrix can be referred to as a longitudinal covariance matrix, and the inverse of this covariance matrix can be referred to as a longitudinal precision matrix. If a feature has a high longitudinal variance, then a unit change in that feature is common for a consumer or other entity. Conversely, if a feature has a low longitudinal variance, then that feature rarely changes with respect to consumers or other entities. The longitudinal covariance matrix can also capture scale. For instance, the longitudinal variance of total credit card balance can be higher than credit card utilization. If two features $x_1$ and $x_2$ (e.g., balance and utilization) are highly correlated, then their (appropriately weighted) sum $(x_1+ax_2)$ will have a higher longitudinal variance still.

The covariance matrix itself does not give a metric on the feature space. Specifically, covariance is a symmetric bilinear form on the space V of random variables over the feature space. This covariance allows the recommendation computing system 130 to compute, for example, $\text{Var}(X_1)$, $\text{Var}(2X_1)$ and $\text{Var}(X_1+X_2)$ for random variables $X_1$ and $X_2$. Here, $\text{Var}(2X_1)=4\,\text{Var}(X_1)$, implying correctly that a unit increase in $2X_1$ is more feasible than a unit increase in $X_1$. But covariance does not assign a value to a specific value $X_1=x_1$. The appropriate way to convert longitudinal covariance to a metric on the feature space is through the longitudinal precision matrix $P=\Sigma^{-1}$. The feature space is dual to the variable space, as a specific value $X=x$ provides a linear map $V \rightarrow R$ by evaluation at x. The precision matrix gives a symmetric bilinear form on the feature space.

The precision matrix, like the covariance matrix, is positive definite and symmetric. The precision matrix therefore produces a valid Riemannian metric. Vectors with high variance have low precision, so a unit change in a common/easy direction in the feature space can be a short path, while a unit change in an uncommon direction can be a long path. A benefit of the precision matrix is that, as its off-diagonal terms represent the negative conditional correlation of features, it captures the fact that certain groups of features usually move together. For example balance and utilization are conditionally positively correlated (almost perfectly), so an increase in balance without a corresponding increase in utilization would be unusual and would have high precision, whereas an increase in balance with a corresponding increase in utilization would be feasible and have a low precision—a short path. For this reason, the precision matrix is commonly referred to as the "surprise" matrix—it quantifies how unusual/surprising an observation is.

When the precision matrix calculated over the whole dataset is used to define a metric, the distance defined by this metric is the Mahalanobis distance. The recommendation computing system 130 can calculate $\Sigma$ over within-subject month-on-month changes, rather than the whole cross-sectional dataset Using precision as a metric from the multivariate normal distribution. Assuming a joint normal distribution with covariance matrix $\Sigma$ (and zero mean), the probability density function ("PDF") is proportional to $\exp(-x^T P x)$ so $x^T P x$ precisely quantifies the (un)likelihood of a value x. Further justification comes from comparison with the Fisher Information Metric. Under a certain setup, the inverse of the Fisher Information Matrix is a covariance matrix for parameter estimates.

Solving for the steepest score increase. In one example, a score can be included in the calculation of the covariance matrix $\Sigma$. Ignoring for now the possibility that $\Sigma$ may be singular, the recommendation computing system 130 can find the direction of steepest score increase, with respect to the precision metric, by minimizing $x^T \Sigma^{-1} x$ subject to the constraint $e_s^T x = k$ where $e_s$ is a standard basis vector in the score coordinate of x and k is any positive value. This gives the Lagrangian $x^T \Sigma^{-1} x - \lambda(e_s^T x - k)$ solved by $2\Sigma^{-1}x = \lambda e_s \Rightarrow x \propto \Sigma e_s$. This is the s-th column of $\Sigma$, i.e. the vector of covariances with a score, $x_i = \text{Cov}(X_i, \text{score})$. Thus the steepest increase in score, with respect to the precision metric, is obtained by moving in the direction given by the vector $\text{Cov}(X_i, \text{score})$.

Singularity of the covariance matrix. The covariance matrix $\Sigma$ may be singular, and hence not invertible. Or it may be close to singular, rendering computational inversion problematic. The former case will arise if the score is included in calculations and it is a linear combination of the features, or if there are linear relations between the features (such multicollinearity would usually have been removed in model development, but a larger feature set may be used in some cases). The latter case is likely to arise if the score is sufficiently close to linear in the features, especially measured over a subset of the data space, or if there are approximate linear relations between the features.

The solution above for the direction of steepest score increase depends on $\Sigma$ directly, not $\Sigma^{-1}$. However, the derivation is unsound if $\Sigma$ is not invertible, and the use of metric in other ways may be desirable. Hence, the recommendation computing system 130 can use a formulation of the metric and method of calculation that does not rely on $\Sigma$ being invertible.

Diagonalization. As $\Sigma$ is positive semi-definite and symmetric, it can be diagonalized, that is $\Sigma=ADA^{-1}$, where:
D is a real diagonal matrix with diagonal terms equal to the eigenvalues of $\Sigma$, counted up to multiplicity. These are non-negative, as $\Sigma$ is positive semi-definite.
The columns of A are the eigenvectors of $\Sigma$, presented in the same order as their corresponding eigenvalues. The columns of A represent an eigenbasis of $\Sigma$.

If the eigenvalues of $\Sigma$ are distinct, this representation is unique up to the order of the eigenvalues and magnitude of the eigenvectors. If the eigenvalues are not distinct (most likely to be the case when $\Sigma$ is singular, in numerical work) then any basis may be presented for each eigenspace. For the purposes of this work, any valid representation will suffice. It is common to order the eigenvalues so that the diagonal elements of D are given in decreasing order of magnitude. Diagonalisation of $\Sigma$ computationally is a standard numerical routine offered e.g., though numpy.linalg.eig in Python.

It can be useful to distinguish between the numerical representation of a vector x in the ambient attribute space $X \cong \mathbb{R}^n$, and the representation of x in the eigenbasis of $\Sigma$ given by $x'=A^{-1}x$. Note that if E is non-singular, the recommendation computing system 130 can compute $\Sigma^{-1}=AD^{-1}A^{-1}$, and inversion of the diagonal matrix D is trivial (invert each diagonal element). Various uses cases that may be addressed using the recommendation computing system 130 involve $\Sigma$, and hence D, being singular or close to singular.

Decomposition into feasible and non feasible parts. As discussed above, $\Sigma$ can be the covariance matrix of longitudinal changes in attribute values. In the non-singular case, the Mahalanobis distance $D_M(\delta x)^2 = \sqrt{(\delta x-\mu)^T \Sigma^{-1} (\delta x-\mu)}$ represents the infeasibility of a particular change x. Large values of $D_M$ correspond to unlikely values of $\delta x$. In the singular case, all feasible values of $\delta x$ lie in a k-dimensional affine subspace W of the ambient data (attribute) space $X \cong \mathbb{R}^n$, containing $\mu$, where k is the rank of $\Sigma$. Values of $\delta x$ that do not lie in W are not feasible. Informally the recommendation computing system 130 could assign a value $D_M(x)=+\infty$, and this could be reflected by using $+\infty$ (or some large finite value) as an inverse of 0 in $D^{-1}$.

Formally, given a vector $\delta x \in X$ the recommendation computing system 130 can decompose $\delta x$ into feasible and infeasible parts $\delta x=(\mu+w)+w^T$ where $\mu+w$ is the feasible part of $\delta x$, lying in W, and $w^T$ is the infeasible part of $\delta x$ which lies in the zero eigenspace of $\Sigma$.

This decomposition is unique and can be obtained computationally as follows. Assume $\Sigma$ is diagonalized as $\Sigma=ADA^{-1}$, where the first k diagonal entries of D are non-zero, and the remaining n–k diagonal entries are zero or negligibly small. Let $I_k \oplus 0_{n-k}$ be the diagonal matrix whose first k diagonal entries are one, and the remaining are zero; so $I_k \oplus 0_{n-k}$ represents projection onto the first k coordinates. Similarly, let $0_k \oplus I_{n-k}$ be the diagonal matrix whose first k diagonal entries are zero, and the remaining are one; so $0_k \oplus I_{n-k}$ represents projection onto the last n–k coordinates. The composite $A(I_k \oplus 0_{n-k})A^{-1}$ represents the selection of the first k coordinates of a vector in the chosen eigenbasis of $\Sigma$. Here, $w = A(I_k \oplus 0_{n-k})A^{-1}(\delta x - \mu)$ and similarly $w^T = A(0_k \oplus I_{n-k})A^{-1}(\delta x - \mu)$. Therefore, in an attribute space, $\delta x_f = \mu + w = \mu + A(I_k \oplus 0_{n-k})A^{-1}(\delta x - \mu)$ the feasible part of $\delta x$ and $\delta x_{if} = w^T = A(0_k \oplus I_{n-k})A^{-1}(\delta x - \mu)$ for the infeasible part of $\delta x$. With respect to the eigenbasis of $\Sigma$, the recommendation computing system 130 uses representations $\delta x'_f = x' + (I_k \oplus 0_{n-k})(\delta x' - \mu')$ and $\delta x'_{if} = (0_k \oplus I_{n-k})(\delta x' - \mu')$ Calculation of the metric. With the set up above, calculation of the metric for a given value of $\delta x$ has two steps:

(1) Calculate the feasible and infeasible parts of $\delta x$. If the infeasible part of $\delta x$ is not negligibly different from zero, then moving by $\delta x$ breaches an absolute linear constraint on the manifold L of feasible values of x. This potential value of $\delta x$ should be discarded.

(2) If the infeasible part of $\delta x$ is within the tolerance of zero, calculate the metric based on the feasible part of $\delta x$ using the formula $D_M(\delta x) = \sqrt{(\delta x - \mu)^T AD'A^{-1}(\delta x - \mu)}$ where D' is a pseudo-inverse for the diagonal matrix D created by inverting the non-zero diagonal entries of D. The matrix $\Sigma' = AD'A^{-1}$ may be treated as a pseudo-inverse for $\Sigma$ that ignores vectors perpendicular to the data manifold.

Small, non-zero eigenvalues. Small, non-zero eigenvalues of $\Sigma$ represent directions in attribute space in which a small change is possible. A priori these represent either:

(1) Combinations of variables for which the within-individual variance is small compared to the scale of the data (assuming attribute values have been normalized).

(2) Curvature of the data manifold. If there is a non-linear constraint on attribute values, this can be reflected locally as an approximate linear constraint. Movements within the calculated variance in this direction must be permitted in order to allow feasible points of the manifold to be found. Projection back on to the manifold may be necessary (see below).

Set up in terms of manifolds in attribute space. The tangent space of the ambient attribute space can be decomposed into three components. First, there is a manifold M of feasible points (combinations of attribute values) for all individuals. M is subject to linear and non-linear constraints, e.g., secured accts+unsecured accts=total accts; utilisation=balance/limit that must hold for all points. If the score is included in the attribute space, the relationship between score and other attributes is another constraint. Within M there is a submanifold L of feasible points for a given individual. L is subject to further linear and non-linear constraints e.g., the difference (time on file–age of oldest account) is fixed if the edge cases are excluded. The recommendation computing system 130 might be configured on the assumption that a number of accounts are fixed. Note that points the individual is unlikely to reach in a short amount of time, e.g., large reductions in balance, are still in L but are far away in the metric on L.

A large number of points of M is available in the development sample. The recommendation computing system 130 may have access to only one point on L, given at the run time. The recommendation computing system 130 can deduce L from its tangent metric and known constraints.

Moving on the manifold L. Previous examples have forgotten about M and considered a metric on L based on the longitudinal covariance matrix. A tangent vector to L can be found that maximizes a score increase for a fixed step size. As L is not linear, taking a step along a tangent vector can lead to a point that is slightly off the manifold L. (Linear constraints can be respected, but non-linear constraints may be violated.) In this example, one must return to L and must therefore determine a direction of movement.

If specific non-linear constraints are imposed on L, then constraints are enforced. Other than that, constraints on L are encoded in the tangent metric and are followed as closely as possible. If, in this example, one is located on M, and not in breach of any imposed constraint, one should not assume that one is on L.

Returning to M. If, in this example, a path is not in M, a direction of movement back to M should be determined. For instance, the recommendation computing system 130 can determine a direction of movement that is perpendicular to M. In this example, the determination should not breach any constraint on L that is not a constraint on M A variable that can vary over M, e.g., number of accounts, will have a positive cross-sectional variance. So will a linear combination of that variable and a true constraint on M. The recommendation computing system 130 must therefore make a change to a variable that has zero variance in the (local) correlation structure on M. That is, the recommendation computing system 130 must move in the zero (or negligible) eigenspace of the cross-sectional covariance matrix. As M is non-linear, there may be small eigenvectors as well as zero eigenvectors when the recommendation computing system 130 measure local covariance. Note that the cross-sectional covariance matrix gives a metric on M, but it does not necessarily coincide with the metric on L. In this example, only one direction will get the recommendation computing system 130 to M.

In this example, a two-dimensional normal space around a one-dimensional manifold in $R^3$ (e.g., a tube shape) can be pictured, where one normal direction reaches M In some cases, the recommendation computing system 130 knows when a path is on M using known non-linear constraints. If so, the recommendation computing system 130 can treat these known non-linear constraints the way the recommendation computing system 130 treats known non-linear constraints on L (see below). Otherwise, the recommendation computing system 130 learns constraints on M from the data. The problem is to find a point that is on M. Doing so can involve finding some nearby points of M. Each of them differs from the current point by a vector parallel to M and a vector perpendicular to M. The perpendicular vectors should all be similar, but not necessarily the same, as M is curved.

To choose a perpendicular vector, the nearest point as measured parallel to M in the metric on M is selected, or nearby points are weighted according to their distance parallel to M. A path can be found by moving by the part of the vector from a current location to the chosen point or average point that is perpendicular to M.

Returning to L. The example above does not require breaching any linear constraint on L or M if a tangent step is taken. Returning to M does not breach any linear constraint on L that is not a linear constraint on M, and therefore does not breach any linear constraint on L at all.

A direction of movement upon a return to M (but not to L due to a breach of known non-linear constraints on L) is determined by moving to a point that satisfies the constraints. The movement must not breach any other constraints on L, where the other constraints are determined through the tangent space decomposition. The movement does not breach any true linear constraint on L if a tangent vector is followed. A linear approximation to a known non-linear constraint is obeyed. If the recommendation computing system 130 knows the non-linear constraint the recommendation computing system 130 has breached, then the recommendation computing system 130 knows the linear approximation the recommendation computing system 130 has followed.

In another example, L can be pictured as a curve in a plane in $R^3$. Here, there is one true linear constraint (stay in the plane) and one that is approximated (move along the curve). A movement in $R^3$ has followed a tangent vector and left the curve. Returning to the curve involves staying in the plane (e.g., obeying linear constraints and linear approximation to unknown non-linear constraints). To maintain an optimal score increase, the recommendation computing system finds the direction in M, orthogonal to the tangent space to L, that represents grad(F)|M·grad(F).

A feasibility metric with categorical variables. When all attributes are continuous (with no missing values) the feasibility metric uses the Mahalanobis distance based on longitudinal (within individual) changes in attribute values between two adjacent time periods. Specifically $D(\delta x)=D_M(\delta x-\mu)$ where $\mu$ is the mean change. Under assumptions of normality, this translates monotonically into the likelihood of a particular change $\delta x$, since the squared distance $D_M(\delta x-\mu)^2$ is twice the negative log-likelihood of the multivariate normal distribution modulo an additive constant. Putting an upper bound on $D_M$ is equivalent to putting a lower bound on the likelihood (or an upper bound on the information value) of the value of $\delta x$.

Here, both $\mu$ and the covariance matrix $\Sigma$ used in the calculation of $D_M$ are conditional values. The $\mu$ and the covariance matrix $\Sigma$ are conditioned on the value of the attributes at the start of the time step t=i. The relationship between squared distance and negative log-likelihood extends naturally to categorical/binary variables. Conditional on the value of all variables (categorical and continuous) at time t=i, the recommendation computing system 130 may compute the PDF of $\delta x$ as $f(\delta x)=p(x_1, \ldots, x_K) g(x_{K+1}, \ldots, x_n | x_1, \ldots, x_k)$ where $X_1, \ldots, X_k$ are the categorical variables, $p(x_1, \ldots, x_k)=p(X_1=x_1, \ldots, X_k=x_k)$ is the probability of the categorical variables taking a particular set of values, and g is the PDF for the continuous variables $X_{k+1}, \ldots, X_n$, conditional on the values of $X_1, \ldots, X_k$. Under a normality assumption on the continuous variables again (an alternative is to use a non-parametric metric such rank-Mahalanobis distance), -2 log g is equal to the squared Mahalanobis distance $D'_M(\delta x'-\mu')^2$ modulo an additive constant, where $\delta x'=(x_{k+1}, \ldots, x_n)$ is the continuous part of $\delta x$, $\mu'$ is the mean of the (change in the) continuous variables conditional on the value of the categorical variables, and $D_M$ uses the covariance of the continuous variables conditional on the value of the categorical variables.

Here, twice the negative log likelihood is $-2 \log p + (D'_M)^2$ modulo an additive constant so $D^2=-2 \log p + (D'_M)^2$ is an appropriate equivalent to the squared distance. This can be referred to as the likelihood distance. Consistent with the geometric intuition of the continuous case, it may be helpful to interpret $\sqrt{-2\log p}$ as an orthogonal distance from a mean value of the categorical variables to the manifold defined by each set of possible values.

A bound on the likelihood distance. Establishing an appropriate threshold on $D^2$ is not as straightforward as in the pure continuous case, where $D_M^2$ is theoretically distributed k-squared with n degrees of freedom. An interval J consisting of the most likely values of $\delta x$, satisfying i) if $x \in J$ and $y \notin J$ then $f(x)>f(y)$ ii) the integral of $f(x)$ over J is equal to 1-q, i.e. $x \in J$ with probability 1-q for some threshold probability q can be used to establish the threshold.

This amounts to finding threshold values $h(x_1, \ldots, x_k)$ for each combination of values of the categorical variables, satisfying $-2 \log p(x_1, \ldots, x_k) + h(x_1, \ldots, x_k)$=constant and $\Sigma p(x_1, \ldots, x_k) X_{n-k}^2(h)=1-q$, where q is the threshold probability and $X_{n-k}^2(h)$ is the cdf for the X-squared distribution with n-k degrees of freedom. This can be straightforward numerically, only requiring optimization of the constant h-2 log p.

A Mahalanobis metric, and hence a conditional covariance matrix, can be used for each combination of categorical variable values at time t=i+1 conditional on each combination of values at time t=i. In practice, it may not be feasible to calculate and invert this many separate matrices, so assumptions can be made about the dependence on the categorical variables x(i) and x(i+1) at time i and time i-1. For instance, these assumptions could be that the covariance of the continuous variables is dependent on only one, or neither, or that the values of the categorical variables before and after affect the scale but not the shape of the covariance.

Missing values. Suppose $x_j$ is a continuous variable that may be missing, and there is no natural value to recode the missing variable. For example, $x_j$ may be average credit card utilization. Mathematically the space of feasible attribute values splits into two manifolds: An l-dimensional manifold $L^+$ where $x_j$ is not missing, and an (l−1)-dimensional manifold $L^-$ where $x_j$ is missing. The recommendation computing system 130 can calculate an l-dimensional metric on $L^+$ and an (l−1)-dimensional metric on L. The recommendation computing system 130 can calculate the probabilities of moving from $L^-$ to $L^+$ and of moving from $L^+$ to $L^-$ conditional on attribute values. The recommendation computing system 130 can calculate the average change in the values of attributes other than $x_j$, and the expected value of $x_j$ should it change from missing to non-missing. However, from a practical point of view, it may be easier to work with data without missing values and to calculate covariance matrices and metrics of a single dimensionality. The recommendation computing system 130 can achieve this by:

Introducing a dummy 'missing indicator' for $x_j$ into the attribute space.

Replacing the missing values of $x_j$ with either a fixed value or a value that depends on the other attributes.

Here, missing values of $x_j$ can be replaced with a value that reflects as closely as possible the expected value of $x_i$ at the next time step, given that $x_j$ becomes non-missing. For instance, for "age of oldest bankcard trade," this would be one month, and the expected change in $x_j$ given that the missing flag changes from one to zero is zero. This expected value could be conditioned on the value of other attributes.

Alternatively, the recommendation computing system 130 could replace missing values of $x_j$ with the expected value of $x_j$ at the next time step, provided that $x_j$ becomes non-missing minus the mean change in $x_j$ when it is non-missing before and after a time step. In this case, the expected change in $x_j$ given that the missing flag changes from one to zero is the same as the expected change given that the missing flag is zero and remains zero.

In either case, the change in $x_j$ when the missing flag is one and remains one can be zero if the replacement value is not conditioned on the value of other attributes. If the replacement value is conditioned on the value of other attributes, it may change even though $x_j$ is in fact still missing.

Estimating the feasibility metric. Certain aspects use a "feasibility" metric for changes in attribute values between time points t=i and t=i+1 based on the longitudinal mean change and covariance matrix, combined with transition probabilities between values of categorical/binary variables. Options for the exact formulation are described elsewhere. The feasibility metric depends on the attribute values x(t) at time t=i. In one example, to calculate a feasibility metric that depends on the attribute values the recommendation computing system 130 choose from the following options:

1) Clustering the development sample based on attribute values (including score) at time t=0, using a dissimilarity metric based on (a) Euclidean distance in the attribute space, (b) Mahalanobis distance based on cross-sectional (between individual) covariance, and (c) Expert overlay based on known behavior of attributes. Clusters are generated in the development stage and a feasibility metric defined for each. At run time, x(t) is assigned to a cluster (e.g., by nearest cluster mean) and the feasibility metric for that cluster is used.
2) Applying k-nearest neighbor clustering at run time. At run time, the distance between x(t) and each point of (a subset of) the development sample is calculated. The nearest k points to x(t) for some value of k are chosen, and the feasibility metric calculated 'on the fly' from these points. As with clustering (1) there is a choice of dissimilarity metric. The number of neighbors k is chosen to achieve a trade-off between the locality of the metric (it should reflect 'similar' individuals to the user) and robustness of the metric calculation (a larger k will give a more stable metric).
3) Kernel smoothing. At run time, the distance between x(t) and each point of (a subset of) the development sample is calculated. The feasibility metric is calculated using all observations in the development sample using a weight that reflects the distance from x(t). There is a choice of dissimilarity metric again. A Gaussian kernel (proportional to $\exp(-d^2)$) is a possible choice. The resolution of the kernel is chosen to achieve a trade-off between the locality and robustness of the calculation. The k-nearest neighbors approach (2) is technically a kernel smoothing approach using the nearest neighbor smoother.

If nearest neighbors or kernel smoothing is used, calculations against the development sample need to be carried out at run time. Partitioning of the development sample is an option to reduce computational load. As the feasibility metric is likely to be a function of first and second order moments of the data (mean and covariance of changes), record level contributions to the relevant moments can be calculated in advance and weighted at run time.

Examples of Operations Performed by Host Systems Using a Set of Risk Assessment Models A recommendation computing system 130 can execute the automated modeling code 114 to perform one or more operations. In an illustrative example of a process executed by a recommendation computing system 130, the recommendation computing system 130 can receive or otherwise access input attribute data. For instance, a recommendation computing system 130 can be communicatively coupled to one or more non-transitory computer-readable media, either locally or via a data network. The recommendation computing system 130 can request, retrieve, or otherwise access input attribute data that includes data values of one or more predictor variables with respect to a target, such as a target individual or other entity.

Continuing with this example, the recommendation computing system 130 can compute a recommendation for an entity. The recommendation computed by the recommendation computing system 130 can be used to modify a host system operation, where a host system could be different types of machine-implemented systems within a given operating environment.

In some aspects, recommendations generated by the recommendation computing system 130 can be used to mitigate the risk of failure of a hardware component within a set of machinery or a malfunction associated with the hardware component. A recommendation computing system 130 can compute and output a recommendation to a user computing system 106, such as a laptop or mobile device used to monitor a manufacturing or medical system, a diagnostic computing device included in an industrial setting, etc. The recommendation can include changes in attribute values that will hasten or delay the malfunction or failure of the hardware component, a set of actions to achieve the changes in attribute values (e.g., by replacing a hardware component within a given time period), or some combination thereof. The operating environment can be modified by performing maintenance, repairs, or replacement in accordance with the recommendation.

In additional or alternative aspects, the recommendation generated by the recommendation computing system 130 can be used to modify a risk assessment score associated with a target entity (e.g., a consumer or other user) that is described by or otherwise associated with the input attribute data. Modifying the host system operation based on the recommendation can include causing another computing system to control access to one or more interactive computing environments by a target entity associated with the input attribute data.

For example, a host computing system can include one or more processing devices that execute instructions providing an interactive computing environment accessible to user computing systems 106. Examples of the interactive computing environment include a mobile application specific to a particular host computing system, a web-based application accessible via a mobile device, etc. In some aspects, the executable instructions for the interactive computing environment can include instructions that provide one or more graphical interfaces. The graphical interfaces are used by a user computing system 106 to access various functions of the interactive computing environment. For instance, the interactive computing environment may transmit data to and receive data from a user computing system 106 to shift between different states of the interactive computing environment, where the different states allow one or more electronics transactions between the user computing system 106 and the host computing system to be performed. If a risk level is sufficiently low (e.g., is less than a user-specified threshold), the host computing system can provide a user computing system 106 associated with the target entity with access to a permitted function of the interactive computing environment. If a risk level is too high (e.g., exceeds a user-specified threshold), the host computing system can prevent a user computing system 106 associated with the target entity from accessing a restricted function of the interactive computing environment.

The following discussion involves, for illustrative purposes, a simplified example of an interactive computing environment implemented through a host computing system to provide access to various online functions. In this example, a user of a user computing system 106 can engage in an electronic transaction with a host computing system via an interactive computing environment. An electronic transaction between the user computing system 106 and the host computing system can include, for example, the user computing system 106 being used to query a set of sensitive or other controlled data, access online financial services provided via the interactive computing environment, submit an online credit card application or other digital application to the host computing system via the interactive computing environment, operating an electronic tool within an interactive computing environment provided by a host computing system (e.g., a content-modification feature, an application-processing feature, etc.), or perform some other electronic operation within a computing environment.

For instance, a website or other interactive computing environment provided by a financial institution's host computing system can include electronic functions for obtaining one or more financial services, such as loan application and management tools, credit card application and transaction management workflows, electronic fund transfers, etc.. A user computing system 106 can be used to request access to the interactive computing environment provided by the host computing system, which can selectively grant or deny access to various electronic functions.

Based on the request, the host computing system can collect data associated with the customer and generate or request a risk assessment for the user of the consumer computing system. The host computing system can use the risk assessment to instruct another device, such as a web server within the same computing environment as the host computing system or an independent, third-party computing system in communication with the host computing system. The instructions can indicate whether to grant the access request of the user computing system 106 to certain features of the interactive computing environment.

For instance, if a risk assessment indicates that a target entity is associated with a sufficient likelihood of a particular risk, a user computing system 106 used by the target entity can be prevented from accessing certain features of an interactive computing environment. The system controlling the interactive computing environment can prevent, based on the threshold level of risk, the user computing system 106 from advancing a transaction within the interactive computing environment. Preventing the user computing system 106 from advancing the transaction can include, for example, sending a control signal to a web server hosting an online platform, where the control signal instructs the web server to deny access to one or more functions of the interactive computing environment (e.g., functions available to authorized users of the platform).

Additionally or alternatively, modifying the host system operation based on the computed time of the target can include causing a system that controls an interactive computing environment to modify the functionality of an online interface provided to a user computing system 106 associated with the target entity. For instance, a host computing system can use a particular risk assessment score, which could be generated by an entity assessment server 118 or other system, to implement a modification to an interface of an interactive computing environment presented at a user computing system 106. In this example, the user computing system 106 is associated with a particular entity whose input attribute data is used by the recommendation computing system 130 to compute a recommendation. The recommendation can be used by the entity to improve a risk assessment score. Based on this improved risk assessment score, the host computing system could rearrange the layout of an online interface so that features or content associated with a particular risk level (e.g., a sufficiently high credit score) are presented more prominently (e.g., by presenting online products or services targeted to the risk level), features or content associated with different risk levels are hidden, presented less prominently, or some combination thereof.

In various aspects, the host computing system could perform these modifications automatically based on an analysis of a risk assessment score (alone or in combination with other data about the entity), manually based on user inputs that occur subsequent to computing the risk assessment score, or some combination thereof. In some aspects, modifying one or more interface elements is performed in real time, i.e., during a session in which a user computing system 106 accesses or attempts to access an interactive computing environment. For instance, an online platform may include different modes, in which a first type of interactive user experience (e.g., placement of menu functions, hiding or displaying content, etc.) is presented to a first type of user group associated with a first risk level and a second type of interactive user experience is presented to a second type of user group associated with a different risk level. If, during a session, timing data is computed that indicates that a user of the user computing system 106 belongs to the second group, the online platform could switch to the second mode.

Example of Using a Neural Network for Risk Assessment

In some aspects, a risk assessment model used to compute risk assessment scores can be a neural network model. A neural network can be represented as one or more hidden layers of interconnected nodes that can exchange data between one another. The layers may be considered hidden because they may not be directly observable in the normal functioning of the neural network.

A neural network can be trained in any suitable manner. For instance, the connections between the nodes can have numeric weights that can be tuned based on experience. Such tuning can make neural networks adaptive and capable of "learning." Tuning the numeric weights can involve adjusting or modifying the numeric weights to increase the accuracy of a risk indicator, prediction of entity behavior, or other response variables provided by the neural network. Additionally or alternatively, a neural network model can be trained by iteratively adjusting the predictor variables represented by the neural network, the number of nodes in the neural network, or the number of hidden layers in the neural network. Adjusting the predictor variables can include eliminating the predictor variable from the neural network. Adjusting the number of nodes in the neural network can include adding or removing a node from a hidden layer in the neural network. Adjusting the number of hidden layers in the neural network can include adding or removing a hidden layer in the neural network.

In some aspects, training a neural network model for each time bin includes iteratively adjusting the structure of the neural network (e.g., the number of nodes in the neural network, number of layers in the neural network, connections between layers, etc.) such that a monotonic relationship exists between each of the predictor variables and the risk indicator, prediction of entity behavior, or other response variables. Examples of a monotonic relationship between a predictor variable and a response variable include a relationship in which a value of the response variable increases as the value of the predictor variable increases or a relationship in which the value of the response variable decreases as the value of the predictor variable increases. The neural network can be optimized such that a monotonic relationship exists between each predictor variable and the response variable. The monotonicity of these relationships can be determined based on a rate of change of the value of the response variable with respect to each predictor variable.

In some aspects, the monotonicity constraint is enforced using an exploratory data analysis of the training data. For example, if the exploratory data analysis indicates that the relationship between one of the predictor variables and an odds ratio (e.g., an odds index) is positive, and the neural network shows a negative relationship between a predictor variable and a credit score, the neural network can be modified. For example, the predictor variable can be eliminated from the neural network or the architecture of the neural network can be changed (e.g., by adding or removing a node from a hidden layer or increasing or decreasing the number of hidden layers).

Example of Using a Logistic Regression for Risk Assessment

In additional or alternative aspects, a risk assessment model used for computing risk assessment scores can be a logistic regression model. A logistic regression model can be generated by determining an appropriate set of logistic regression coefficients that are applied to predictor variables in the model. For example, input attributes in a set of training data are used as the predictor variables. The logistic regression coefficients are used to transform or otherwise map these input attributes into particular outputs in the training data.

Example of Using a Tree-Based Risk Assessment Model

In additional or alternative aspects, a risk assessment model used for computing risk assessment scores can be a tree-based machine-learning model. For example, the model-configuration application 112 can retrieve an objective function from a non-transitory computer-readable medium. The objective function can be stored in the non-transitory computer-readable medium based on, for example, one or more user inputs that define, specify, or otherwise identify the objective function. In some aspects, the model-configuration application 112 can retrieve the objective function based on one or more user inputs that identify a particular objective function from a set of objective functions (e.g., by selecting the particular objective function from a menu).

The model-configuration application 112 can partition, for each predictor variable in the set X, a corresponding set of the predictor variable values. The model-configuration application 112 can determine the various partitions that maximize the objective function. The model-configuration application 112 can select a partition that results in an overall maximized value of the objective function as compared to each other partition in the set of partitions. The model-configuration application 112 can perform a split that results in two child node regions, such as a left-hand region $R_L$ and a right-hand region $R_R$. The model-configuration application 112 can determine if a tree-completion criterion has been encountered. Examples of tree-completion criteria include, but are not limited to: the tree is built to a pre-specified number of terminal nodes, or a relative change in the objective function has been achieved. The model-configuration application 112 can access one or more tree-completion criteria stored on a non-transitory computer-readable medium and determine whether a current state of the decision tree satisfies the accessed tree-completion criteria. If so, the model-configuration application 112 can output the decision tree. Outputting the decision tree can include, for example, storing the decision tree in a non-transitory computer-readable medium, providing the decision tree to one or more other processes, presenting a graphical representation of the decision tree on a display device, or some combination thereof.

Regression and classification trees partition the predictor variable space into disjointed regions, $R_k (k=1, \ldots, K)$. Each region is assigned a representative response value $\beta_k$. A decision tree T can be specified as:

$$T(x; \Theta) = \Sigma_{k=1}^k \beta_k I(x \in R_k), \quad (65)$$

where $\Theta = \{R_k, \beta_k\}_1^K$, $I(\cdot) = 1$ if the argument is true and 0 otherwise, and all other variables previously defined. The parameters of Equation (14) are found by maximizing a specified objective function L:

$$\hat{\Theta} = \mathrm{argmax}_\Theta \Sigma_{i=1}^n L(y_i, T(x_i; \Theta)). \quad (66)$$

The estimates, $\hat{R}_k$, of $\hat{\Theta}$ can be computed using a greedy (i.e. choosing the split that maximizes the objective function), top-down recursive partitioning algorithm, after which estimation of $\beta_k$ is superficial (e.g., $\hat{\beta}_k = f(y_i \in \hat{R}_k)$).

A random forest model is generated by building independent trees using bootstrap sampling and a random selection of predictor variables as candidates for splitting each node. The bootstrap sampling involves sampling certain training data with replacement, so that the pool of available data samples is the same between different sampling operations. Random forest models are an ensemble of independently built tree-based models. Random forest models can be represented as:

$$F_M(x; \Omega) = q \Sigma_{m=1}^M T_m(x; \Theta_m), \quad (67)$$

where M is the number of independent trees to build, $\Omega = \{\Theta_m\}_1^M$, and q is an aggregation operator or scalar (e.g., $q = M^{-1}$ for regression), with all other variables previously defined.

To create a random forest model, the model-configuration application 112 can select or otherwise identify a number M of independent trees to be included in the random forest model. For example, the number M can be stored in a non-transitory computer-readable medium accessible to the model-configuration application 112, can be received by the model-configuration application 112 as a user input, or some combination thereof. The model-configuration application 112 can select, for each tree from 1 ... M, a respective subset of data samples to be used for building the tree. For example, for a given set of the trees, the model-configuration application 112 can execute one or more specified sampling procedures to select the subset of data samples. The selected subset of data samples is a bootstrap sample for that tree.

The model-configuration application 112 can execute a tree-building algorithm to generate the tree based on the respective subset of data samples for that tree. For instance, the model-configuration application 112 can select, for each split in the tree building process, k out of p predictor variables for use in the splitting process using the specified objective function. The model-configuration application 112 can combine the generated decision trees into a random forest model. For example, the model-configuration application 112 can generate a random forest model $F_M$ by summing the generated decision trees according to the function $F_M(x; \hat{\Omega}) = q\Sigma_{m=1}^M T_m(x; \hat{\Theta}_m)$. The model-configuration application 112 can output the random forest model. Outputting the random forest model can include, for example, storing the random forest model in a non-transitory computer-readable medium, providing the random forest model to one or more other processes, presenting a graphical representation of the random forest model on a display device, or some combination thereof.

Gradient boosted machine models can also utilize tree-based models. The gradient boosted machine model can be generalized to members of the underlying exponential family of distributions. For example, these models can use a vector of responses, $y = \{y_i\}_1^n$, satisfying $$y = \mu + e, \quad (68)$$

and a differentiable monotonic link function $F(\cdot)$ such that $$F_M(\mu) = \Sigma_{m=1}^M T_m(x; \Theta_m), \quad (69)$$

where, $m = 1, \ldots, M$ and $\Theta = \{R_k, \beta_k\}_1^K$. Equation (18) can be rewritten in a form more reminiscent of the generalized linear model as $$F_M(\mu) = \Sigma_{m=1}^M X_m \beta_m \quad (70)$$

where, $X_m$ is a design matrix of rank k such that the elements of the $i^{th}$ column of $X_m$ include evaluations of $I(x \in R_k)$ and $\beta_m = \{\beta\}_1^k$. Here, $X_m$ and $\beta_m$ in represent the design matrix (basis functions) and corresponding representative response values of the $m^{th}$ tree. Also, e is a vector of unobserved errors with $E(e|\mu) = 0$ and $$\text{cov}(e|\mu) = R_\mu. \quad (71)$$

Here, $R_\mu$ is a diagonal matrix containing evaluations at $\mu$ of a known variance function for the distribution under consideration.

Estimation of the parameters in Equation (69) involves maximization of the objective function $$\hat{\Theta} = \text{argmax}_\Theta \Sigma_{i=1}^n L(y_i, \Sigma_{m=1}^M T_m(x_i; \Theta_m)). \quad (72)$$

In some cases, maximization of Equation (72) is computationally expensive. An alternative to direct maximization of Equation (72) is a greedy stage-wise approach, represented by the following function:

$$\hat{\Theta}_m = \text{argmax}_\Theta \Sigma_{i=1}^n L(y_i, T_m(x_i; \Theta_m) + v). \quad (73)$$

Thus, $$F_m(\mu) = T_m(x; \Theta_m) + v \quad (74)$$

where, $v = \Sigma_{j=1}^{m-1} F_j(\mu) = \Sigma_{j=1}^{m-1} T_j(x; \Theta_j)$.

Methods of estimation for the generalized gradient boosting model at the $m^{th}$ iteration are analogous to estimation in the generalized linear model. Let $\hat{\Theta}_m$ be known estimates of $\Theta_m$ and $\hat{\mu}$ is defined as $$\hat{\mu} = F_m^{-1}[T_m(x; \hat{\Theta}_m) + v]. \quad (75)$$

Letting $$z = F_m(\hat{\mu}) + F'_m(\hat{\mu})(y - \hat{\mu}) - v \quad (76)$$

then, the following equivalent representation can be used:

$$z | \Theta_m \sim N[T_m(x; \Theta_m), F'_m(\hat{\mu}) R_\mu F'_m(\hat{\mu})]. \quad (77)$$

Letting $\Theta_m$ be an unknown parameter, this takes the form of a weighted least squares regression with diagonal weight matrix $$\hat{W} = R_\mu^{-1}[F'(\hat{\mu})]^{-2}. \quad (78)$$

Table 2 includes examples of various canonical link functions $\hat{W} = R_\mu$.

TABLE 2

| Distribution | F(μ) | Weight |
|---|---|---|
| Binomial | log[μ/(1 − μ)] | μ(1 − μ) |
| Poisson | log(μ) | μ |
| Gamma | $\mu^{-1}$ | $\mu^{-2}$ |
| Gaussian | μ | 1 |

The response z is a Taylor series approximation to the linked response F(y) and is analogous to the modified dependent variable used in iteratively reweighted least squares. The objective function to maximize corresponding to the model for z is $$L(\Theta_m, R; z) = \quad (79)$$
$$-\frac{1}{2}\log|\phi V| - \frac{1}{2\phi}(z - T_m(x; \Theta_m))^T V^{-1}(z - T_m(x; \Theta_m)) - \frac{n}{2}\log(2\pi),$$

where, $V = W^{-1/2} R_\mu W^{-1/2}$ and $\phi$ is an additional scale/dispersion parameter.

To create a gradient boosted machine model, the model-configuration application 112 can identify a number of trees for a gradient boosted machine model and specify a distributional assumption and a suitable monotonic link function for the gradient boosted machine model. The model-configuration application 112 can select or otherwise identify a number M of independent trees to be included in the gradient boosted machine model and a differentiable monotonic link function $F(\cdot)$ for the model. For example, the number M and the function $F(\cdot)$ can be stored in a non-transitory computer-readable medium accessible to the model-configuration application 112, can be received by the model-configuration application 112 as a user input, or some combination thereof.

The model-configuration application 112 can compute an estimate of $\mu$, $\hat{\mu}$ from the training data or an adjustment that permits the application of an appropriate link function (e.g. $\hat{\mu} = n^{-1}\Sigma_{i=1}^n y_i$), and set $v_0 = F_0(\hat{\mu})$, and define $R_{\hat{\mu}}$. The model-configuration application 112 can generate each decision tree using an objective function such as a Gaussian log likelihood function (e.g., Equation 66). The model-configuration application 112 can regress z to x with a weight matrix $\hat{W}$. This regression can involve estimating the $\Theta_m$ that maximizes the objective function in a greedy manner. The model-configuration application 112 can update $v_m = v_{m-1} + T_m(x; \hat{\Theta}_m)$ and setting $\hat{\mu} = F_m^{-1}(v_m)$. The model-configuration application 112 can execute this operation for each tree. The model-configuration application 112 can output a gradient boosted machine model. Outputting the gradient boosted machine model can include, for example, storing the gradient boosted machine model in a non-transitory computer-readable medium, providing the gradient boosted machine model to one or more other processes, presenting a graphical representation of the gradient boosted machine model on a display device, or some combination thereof.

In some aspects, the tree-based machine-learning model for each time bin is iteratively adjusted to enforce monotonicity with respect to output values associated with the terminal nodes of the decision trees in the model. For instance, the model-configuration application 112 can determine whether values in the terminal nodes of a decision tree have a monotonic relationship with respect to one or more predictor variables in the decision tree. In one example of a monotonic relationship, the predicted response increases as the value of a predictor variable increases (or vice versa). If the model-configuration application 112 detects an absence of a required monotonic relationship, the model-configuration application 112 can modify a splitting rule used to generate the decision tree. For example, a splitting rule may require that data samples with predictor variable values below a certain threshold value are placed into a first partition (i.e., a left-hand side of a split) and that data samples with predictor variable values above the threshold value are placed into a second partition (i.e., a right-hand side of a split). This splitting rule can be modified by changing the threshold value used for partitioning the data samples.

A model-configuration application 112 can also train an unconstrained tree-based machine-learning model by smoothing over the representative response values. For example, the model-configuration application 112 can determine whether values in the terminal nodes of a decision tree are monotonic. If the model-configuration application 112 detects an absence of a required monotonic relationship, the model-configuration application 112 can smooth over the representative response values of the decision tree, thus enforcing monotonicity. For example, a decision tree may require that the predicted response increases if the decision tree is read from left to right. If this restriction is violated, the predicted responses can be smoothed (i.e., altered) to enforce monotonicity.

Computing System Example

Figure 6:
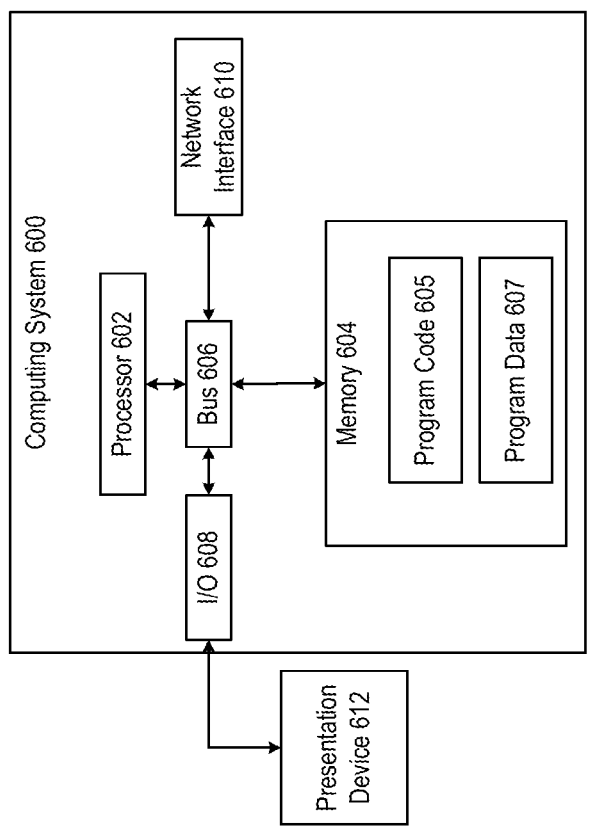
FIG. 6 is a block diagram depicting an example of a computing system suitable for implementing aspects of the techniques and technologies presented herein.

Any suitable computing system or group of computing systems can be used to perform the operations described herein. For example, FIG. 6 is a block diagram depicting an example of a computing system 600 that can be used to implement one or more of the systems depicted in FIG. 1 (e.g., an entity assessment server 118, a development server 110, a client or consumer computing system, etc.). The example of the computing system 600 can include various devices for communicating with other devices in the computing system 100, as described with respect to FIG. 1. The computing system 600 can include various devices for performing one or more of the operations described above.

The computing system 600 can include a processor 602, which includes one or more devices or hardware components communicatively coupled to a memory 604. The processor 602 executes computer-executable program code 605 stored in the memory 604, accesses program data 607 stored in the memory 604, or both. Examples of a processor 602 include a microprocessor, an application-specific integrated circuit, a field-programmable gate array, or any other suitable processing device. The processor 602 can include any number of processing devices, including one. The processor 602 can include or communicate with a memory 604. The memory 604 stores program code that, when executed by the processor 602, causes the processor to perform the operations described in this disclosure.

The memory 604 can include any suitable non-transitory computer-readable medium. The computer-readable medium can include any electronic, optical, magnetic, or other storage device capable of providing a processor with computer-readable program code or other program code. Non-limiting examples of a computer-readable medium include a magnetic disk, memory chip, optical storage, flash memory, storage class memory, a CD-ROM, DVD, ROM, RAM, an ASIC, magnetic tape or other magnetic storage, or any other medium from which a computer processor can read and execute program code. The program code may include processor-specific program code generated by a compiler or an interpreter from code written in any suitable computer-programming language. Examples of suitable programming language include C, C++, C#, Visual Basic, Java, Python, Perl, JavaScript, ActionScript, etc.

The computing system 600 can execute program code 605. The program code 605 may be stored in any suitable computer-readable medium and may be executed on any suitable processing device. For example, as depicted in FIG. 6, automated modeling code 114, program code for a model-configuration application 112, or program code for software on a client or consumer computing system can reside in the memory 604 at the computing system 600. Executing the program code 605 can configure the processor 602 to perform one or more of the operations described herein.

Program code 605 stored in a memory 604 may include machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing or receiving information, data, arguments, parameters, or memory contents. Information, arguments, parameters, data, etc. may be passed, forwarded, or transmitted via any suitable means including memory sharing, message passing, token passing, network transmission, among others. Examples of the program code 605 include one or more of the applications, engines, or sets of program code described herein, such as an automated modeling code 114, a model-configuration application 112, software on a client or consumer computing system, etc.

Examples of program data 607 stored in a memory 604 may include one or more databases, one or more other data structures, datasets, etc. For instance, if a memory 604 is a network-attached storage device, program data 607 can include attribute data stored in a risk data repository 122, as decribed above with respect to FIG. 1. If a memory 604 is a storage device used by a recommendation computing system 130, program data 607 can include input attribute data, data obtained via interactions with client or consumer computing systems, etc.

The computing system 600 may also include a number of external or internal devices such as input or output devices. For example, the computing system 600 is shown with an input/output interface 608 that can receive input from input devices or provide output to output devices. A bus 606 can also be included in the computing system 600. The bus 606 can communicatively couple one or more components of the computing system 600.

In some aspects, the computing system 600 can include one or more output devices. One example of an output device is the network interface device 610 depicted in FIG. 6. A network interface device 610 can include any device or group of devices suitable for establishing a wired or wireless data connection to one or more data networks (e.g., a public data network 108, a private data network 116, etc.). Non-limiting examples of the network interface device 610 include an Ethernet network adapter, a modem, etc. Another example of an output device is the presentation device 612 depicted in FIG. 6. A presentation device 612 can include any device or group of devices suitable for providing visual, auditory, or other suitable sensory output. Non-limiting examples of the presentation device 612 include a touchscreen, a monitor, a speaker, a separate mobile computing device, etc.

General Considerations

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter. The system or systems discussed herein are not limited to any particular hardware architecture or configuration. A computing device can include any suitable arrangement of components that provides a result conditioned on one or more inputs. Suitable computing devices include multipurpose microprocessor-based computing systems accessing stored software that programs or configures the computing system from a general purpose computing apparatus to a specialized computing apparatus implementing one or more aspects of the present subject matter. Any suitable programming, scripting, or other type of language or combinations of languages may be used to implement the teachings contained herein in software to be used in programming or configuring a computing device.

Unless specifically stated otherwise, it is appreciated that throughout this specification that terms such as "processing," "computing," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

Aspects of the methods disclosed herein may be performed in the operation of such computing devices. The order of the blocks presented in the examples above can be varied—for example, blocks can be re-ordered, combined, or broken into sub-blocks. Certain blocks or processes can be performed in parallel. The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific aspects thereof, it will be appreciated that those skilled in the art, upon attaining an understanding of the foregoing, may readily produce alterations to, variations of, and equivalents to such aspects. Any aspects or examples may be combined with any other aspects or examples. Accordingly, it should be understood that the present disclosure has been presented for purposes of example rather than limitation, and does not preclude inclusion of such modifications, variations, or additions to the present subject matter as would be readily apparent to one of ordinary skill in the art.

The invention claimed is:

1. A method in which one or more processing devices of a server system perform operations comprising:
receiving, from a user device, a request for a recommendation for modifying a current value of a risk assessment score computed from input attribute values of an entity associated with the user device to a target value of the risk assessment score, the risk assessment score used to control access by a computing device associated with the entity to an interactive computing environment hosted by a host system, wherein the host system is configured to present a first type of interactive user experience to a first type of user group associated with the current value of the risk assessment score and present to a second type of interactive user experience to a second type of user group associated with the target value of the risk assessment score;
computing an attribute-change vector indicating a path from (a) a first point that is located in an m-dimensional space and that corresponds to the current value of the risk assessment score to (b) a second point in the m-dimensional space and that corresponds to the target value of the risk assessment score, wherein applying a risk assessment function to a sum of an input attribute vector having the input attribute values of the entity and the attribute-change vector outputs the target value of the risk assessment score, wherein computing the attribute-change vector comprises:
 determining, based on statistics computed from an associated user group to which the input attribute vector is assigned, a requirement on movement from the first point to the second point, and
 selecting the attribute-change vector that complies with the requirement;
generating, using the computed attribute-change vector, the recommendation for modifying the current value of the risk assessment score to the target value of the risk assessment score; and
transmitting, to the user device, the recommendation in response to the request for the recommendation for use in improving the current value of the risk assessment score to the target value of the risk assessment score which causes the host system to modify a functionality of an online interface by rearranging a layout of the online interface to switch from presenting the first type of interactive user experience to presenting the second type of interactive user experience.

2. The method of claim 1, wherein:
the risk assessment function defines a surface within the m-dimensional space, and
the path complying with the requirement comprises the path being a shortest path along the surface between the first point and the second point.

3. The method of claim 1, wherein:
the statistics computed from the associated user group comprise a precision matrix for the associated user group and a mean vector, and
the requirement comprises minimizing an objective function subject to a score change constraint that corresponds to the target value of the risk assessment score, the objective function is computed from the precision matrix, the mean vector, and the attribute-change vector.

4. The method of claim 1, wherein
the statistics computed from the associated user group comprise a precision matrix for the associated user group and a mean vector; and
the requirement comprises maximizing a score change objective function subject to a constraint that is computed from the precision matrix, the mean vector, and the attribute-change vector.

5. The method of claim 1, wherein computing the attribute-change vector further comprises determining that the attribute-change vector further complies with at least one constraint, the at least one constraint comprising:
an integer constraint requiring a first element of the attribute-change vector to have an integer value,
an auto-increment constraint requiring a second element of the attribute-change vector to increase over a time period, the time period defined by a first time value associated with the first point and a second time value associated with the second point,
a time constraint preventing a third element of the attribute-change vector from changing over the time period, or
an autoencoder constraint applied to the sum of the input attribute vector and the attribute-change vector.

6. The method of claim 1, wherein generating the recommendation comprises:
generating explanatory data indicating an impact of each value in the attribute-change vector on modifying the current value of the risk assessment score to the target value of the risk assessment score.

7. A non-transitory computer-readable storage medium having program code that is executable by a processor device to cause a computing device to perform operations, the operations comprising:
computing an attribute-change vector indicating a path from (a) a first point that is located in an m-dimensional space and that corresponds to a first value of a risk assessment score computed from input attribute values of an entity to (b) a second point in the m-dimensional space and that corresponds to a second value of the risk assessment score, wherein applying a risk assessment function to a sum of an input attribute vector having the input attribute values of the entity and the attribute-change vector outputs the second value of the risk assessment score, wherein computing the attribute-change vector comprises:
determining, based on statistics computed from an associated user group to which the input attribute vector is assigned, a requirement on movement from the first point to the second point, and
selecting the attribute-change vector that complies with the requirement;
generating, using the computed attribute-change vector, a recommendation for modifying the first value of the risk assessment score to the second value of the risk assessment score, the risk assessment score used to control access by a computing device associated with the entity to an interactive computing environment hosted by a host system, wherein the host system is configured to present a first type of interactive user experience to a first type of user group associated with the first value of the risk assessment score and present to a second type of interactive user experience to a second type of user group associated with the second value of the risk assessment score; and
causing the recommendation to be transmitted in response to a request for the recommendation for use in improving the first value of the risk assessment score to the second value of the risk assessment score which causes the host system to modify a functionality of an online interface by rearranging a layout of the online interface to switch from presenting the first type of interactive user experience to presenting the second type of interactive user experience.

8. The non-transitory computer-readable storage medium of claim 7, wherein the operations further comprise:
updating the input attribute vector by adding the attribute-change vector to the input attribute vector;
assigning the updated input attribute vector to a second associated user group based on a similarity measure between the second associated user group and a second input point defined by the updated input attribute vector; and
computing a second attribute-change vector indicating a second path from (a) the second point to (b) a third point in the m-dimensional space and that corresponds to a third value of the risk assessment score, wherein applying the risk assessment function to a sum of the updated input attribute vector and the second attribute-change vector outputs the third value of the risk assessment score, wherein computing the second attribute-change vector comprises:
determining, based on statistics computed from the second associated user group to which the updated input attribute vector is assigned, a second requirement on movement from the second point to the third point, and
selecting the second attribute-change vector that complies with the second requirement,
wherein the recommendation is generated further using the second attribute-change vector.

9. The non-transitory computer-readable storage medium of claim 7, wherein the risk assessment function defines a surface within the m-dimensional space, and
the path complying with the requirement comprises the path being a shortest path along the surface between the first point and the second point.

10. The non-transitory computer-readable storage medium of claim 7, wherein:
the statistics computed from the associated user group comprise a precision matrix for the associated user group and a mean vector, and
the requirement comprises minimizing an objective function subject to a score change constraint that corresponds to the second value of the risk assessment score, the objective function is computed from the precision matrix, the mean vector, and the attribute-change vector.

11. The non-transitory computer-readable storage medium of claim 7, wherein
the statistics computed from the associated user group comprise a precision matrix for the associated user group and a mean vector; and
the requirement comprises maximizing a score change objective function subject to a constraint that is computed from the precision matrix, the mean vector, and the attribute-change vector.

12. The non-transitory computer-readable storage medium of claim 7, wherein computing the attribute-change vector further comprises determining that the attribute-change vector further complies with at least one constraint, the at least one constraint comprising:
an integer constraint requiring a first element of the attribute-change vector to have an integer value,
an auto-increment constraint requiring a second element of the attribute-change vector to increase over a time period, the time period defined by a first time value associated with the first point and a second time value associated with the second point, a time constraint preventing a third element of the attribute-change vector from changing over the time period, or an autoencoder constraint applied to the sum of the input attribute vector and the attribute-change vector.

13. The non-transitory computer-readable storage medium of claim 7, wherein generating the recommendation comprises:

generating explanatory data indicating impact of each value in the attribute-change vector on modifying a current value of the risk assessment score to a target value of the risk assessment score.

14. A system comprising:

a processing device; and a memory device in which instructions executable by the processing device are stored for causing the processing device to perform operations comprising:

computing an attribute-change vector indicating a path from (a) a first point that is located in an m-dimensional space and that corresponds to a first value of a risk assessment score computed from input attribute values of an entity to (b) a second point in the m-dimensional space and that corresponds to a second value of the risk assessment score, wherein applying a risk assessment function to a sum of an input attribute vector having the input attribute values of the entity and the attribute-change vector outputs the second value of the risk assessment score, wherein computing the attribute-change vector comprises:

determining, based on statistics computed from an associated user group to which the input attribute vector is assigned, a requirement on movement from the first point to the second point, and selecting the attribute-change vector that complies with the requirement;

generating, using the computed attribute-change vector, a recommendation for modifying the first value of the risk assessment score to the second value of the risk assessment score, the risk assessment score used to control access by a computing device associated with the entity to an interactive computing environment hosted by a host system, wherein the host system is configured to present a first type of interactive user experience to a first type of user group associated with the first value of the risk assessment score and present to a second type of interactive user experience to a second type of user group associated with the second value of the risk assessment score; and causing the recommendation to be transmitted in response to a request for the recommendation for use in improving the first value of the risk assessment score to the second value of the risk assessment score which causes the host system to modify a functionality of an online interface by rearranging a layout of the online interface to switch from presenting the first type of interactive user experience to presenting the second type of interactive user experience.

15. The system of claim 14, wherein the operations further comprise:

updating the input attribute vector by adding the attribute-change vector to the input attribute vector;

assigning the updated input attribute vector to a second associated user group based on a similarity measure between the second associated user group and a second input point defined by the updated input attribute vector; and computing a second attribute-change vector indicating a second path from (a) the second point to (b) a third point in the m-dimensional space and that corresponds to a third value of the risk assessment score, wherein applying the risk assessment function to a sum of the updated input attribute vector and the second attribute-change vector outputs the third value of the risk assessment score, wherein computing the second attribute-change vector comprises:

determining, based on statistics computed from the second associated user group to which the updated input attribute vector is assigned, a second requirement on movement from the second point to the third point, and selecting the second attribute-change vector that complies with the second requirement, wherein the recommendation is generated further using the second attribute-change vector.

16. The system of claim 14, wherein the risk assessment function defines a surface within the m-dimensional space, and the path complying with the requirement comprises the path being a shortest path along the surface between the first point and the second point.

17. The system of claim 14, wherein:

the statistics computed from the associated user group comprise a precision matrix for the associated user group and a mean vector, and the requirement comprises minimizing an objective function subject to a score change constraint that corresponds to the second value of the risk assessment score, the objective function is computed from the precision matrix, the mean vector, and the attribute-change vector.

18. The system of claim 14, wherein generating the recommendation comprises:

generating explanatory data indicating impact of each value in the attribute-change vector on modifying a current value of the risk assessment score to a target value of the risk assessment score.

19. The system of claim 14, wherein the statistics computed from the associated user group comprise a precision matrix for the associated user group and a mean vector; and the requirement comprises maximizing a score change objective function subject to a constraint that is computed from the precision matrix, the mean vector, and the attribute-change vector.

20. The system of claim 14, wherein computing the attribute-change vector further comprises determining that the attribute-change vector further complies with at least one constraint, the at least one constraint comprising:

an integer constraint requiring a first element of the attribute-change vector to have an integer value, an auto-increment constraint requiring a second element of the attribute-change vector to increase over a time period, the time period defined by a first time value associated with the first point and a second time value associated with the second point, a time constraint preventing a third element of the attribute-change vector from changing over the time period, or an autoencoder constraint applied to the sum of the input attribute vector and the attribute-change vector.

* * * * *